(12) United States Patent
Komatsu et al.

(10) Patent No.: US 10,210,997 B2
(45) Date of Patent: Feb. 19, 2019

(54) SOLID ELECTROLYTIC CAPACITOR AND MANUFACTURING METHOD THEREOF

(71) Applicant: RUBYCON CORPORATION, Nagano (JP)

(72) Inventors: Akihiko Komatsu, Nagano (JP); Tetsushi Ogawara, Nagano (JP); Yoshishige Sakurai, Nagano (JP); Akira Iijima, Nagano (JP); Hayato Karasawa, Nagano (JP); Masayuki Sakaguchi, Nagano (JP)

(73) Assignee: RUBYCON CORPORATION, Nagano (JP)

( * ) Notice: Subject to any disclaimer, the term of this patent is extended or adjusted under 35 U.S.C. 154(b) by 0 days.

(21) Appl. No.: 15/671,081

(22) Filed: Aug. 7, 2017

(65) Prior Publication Data

US 2018/0040430 A1 Feb. 8, 2018

(30) Foreign Application Priority Data

Aug. 8, 2016 (JP) ................................. 2016-155712
Jul. 8, 2017 (JP) ................................. 2017-134229

(51) Int. Cl.
*H01G 9/022* (2006.01)
*H01G 9/15* (2006.01)
(Continued)

(52) U.S. Cl.
CPC ........... *H01G 9/0425* (2013.01); *H01G 4/008* (2013.01); *H01G 9/0003* (2013.01); *H01G 9/012* (2013.01); *H01G 9/022* (2013.01); *H01G 9/045* (2013.01); *H01G 9/15* (2013.01); *H01G 9/151* (2013.01); *H01G 9/028* (2013.01); *H01G 2009/0014* (2013.01); *H01G 2009/05* (2013.01)

(58) Field of Classification Search
None
See application file for complete search history.

(56) References Cited

U.S. PATENT DOCUMENTS 5,530,139 A * 6/1996 Saida .................... C07D 333/50
544/225
5,853,794 A * 12/1998 Melody .............. C08G 73/0266
427/58
(Continued)

FOREIGN PATENT DOCUMENTS

JP          2016-76680 A     5/2016
WO       2013/094462 A1    6/2013

*Primary Examiner* — Dion Ferguson
(74) *Attorney, Agent, or Firm* — Hauptman Ham, LLP

(57) ABSTRACT

Provided is a solid electrolytic capacitor having a lower leakage current than a conventional solid electrolytic capacitor. The solid electrolytic capacitor includes: an anode foil having a surface on which an oxide film is formed; a cathode foil; and a separator disposed between the anode foil and the cathode foil, wherein a solid electrolyte made of a conductive high-molecular weight compound in a fine particle form and a water-soluble high-molecular weight compound solution which is formed of a water-soluble high-molecular weight compound in a liquid form, water and alcohol having a nitro group are introduced into a gap formed between the anode foil and the cathode foil in a state where the water-soluble high-molecular weight compound solution surrounds the solid electrolyte.

15 Claims, 10 Drawing Sheets

(51) Int. Cl.
  *H01G 9/042*   (2006.01)
  *H01G 9/045*   (2006.01)
  *H01G 4/008*   (2006.01)
  *H01G 9/012*   (2006.01)
  *H01G 9/00*    (2006.01)
  *H01G 9/04*        (2006.01)
  *H01G 9/028*       (2006.01)

(56) References Cited

U.S. PATENT DOCUMENTS

| | | | | |
|---|---|---|---|---|
| 6,285,543 | B1* | 9/2001 | Komatsu | H01G 9/022 |
| | | | | 252/62.2 |
| 6,288,889 | B1* | 9/2001 | Komatsu | H01G 9/022 |
| | | | | 252/62.2 |
| 6,349,028 | B1* | 2/2002 | Komatsu | H01G 9/02 |
| | | | | 361/504 |
| 6,351,370 | B1* | 2/2002 | Konuma | H01G 9/025 |
| | | | | 252/500 |
| 7,691,157 | B2* | 4/2010 | Saida | H01G 9/0036 |
| | | | | 29/25.03 |
| 9,589,738 | B2* | 3/2017 | Sugihara | H01G 9/028 |
| 2004/0245105 | A1* | 12/2004 | Komatsu | H01G 9/022 |
| | | | | 205/58 |
| 2005/0094352 | A1* | 5/2005 | Komatsu | H01G 9/022 |
| | | | | 361/504 |
| 2010/0039751 | A1* | 2/2010 | Oohata | H01G 9/042 |
| | | | | 361/523 |
| 2015/0255220 | A1* | 9/2015 | Komatsu | H01G 9/028 |
| | | | | 361/525 |
| 2016/0099113 | A1* | 4/2016 | Komatsu | H01G 9/025 |
| | | | | 361/525 |

* cited by examiner

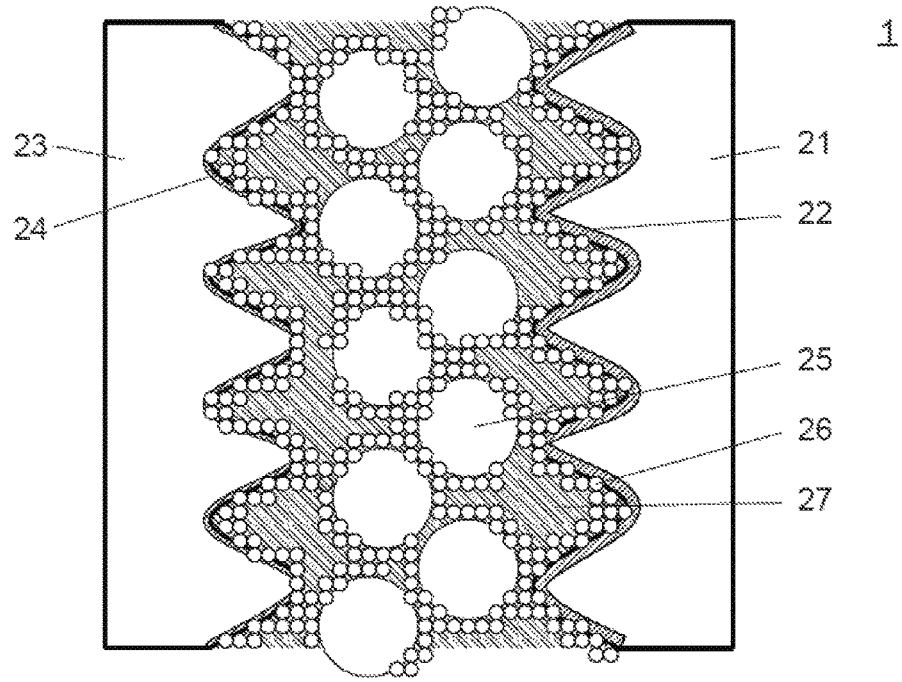
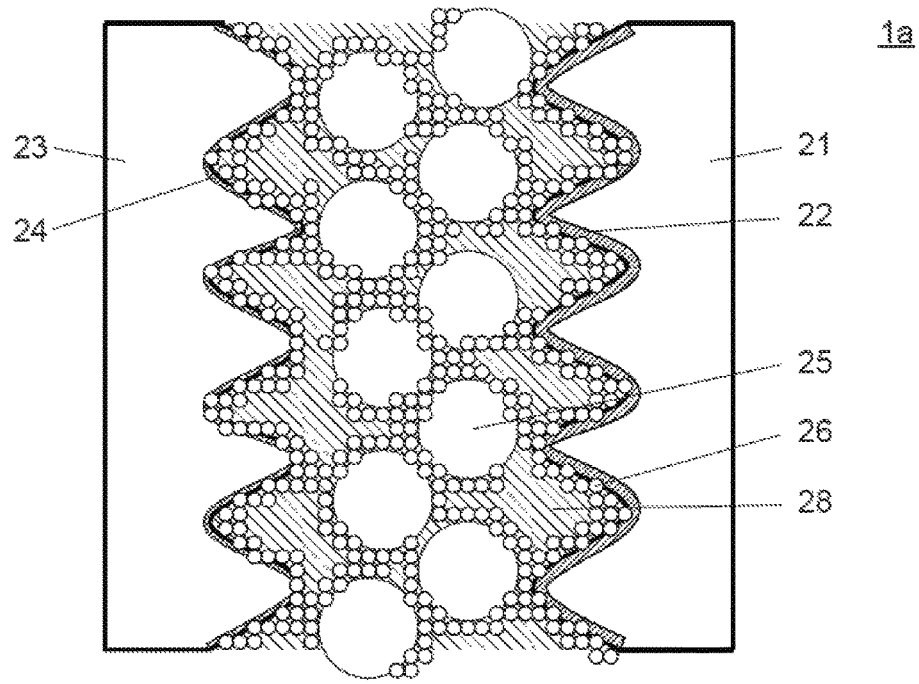

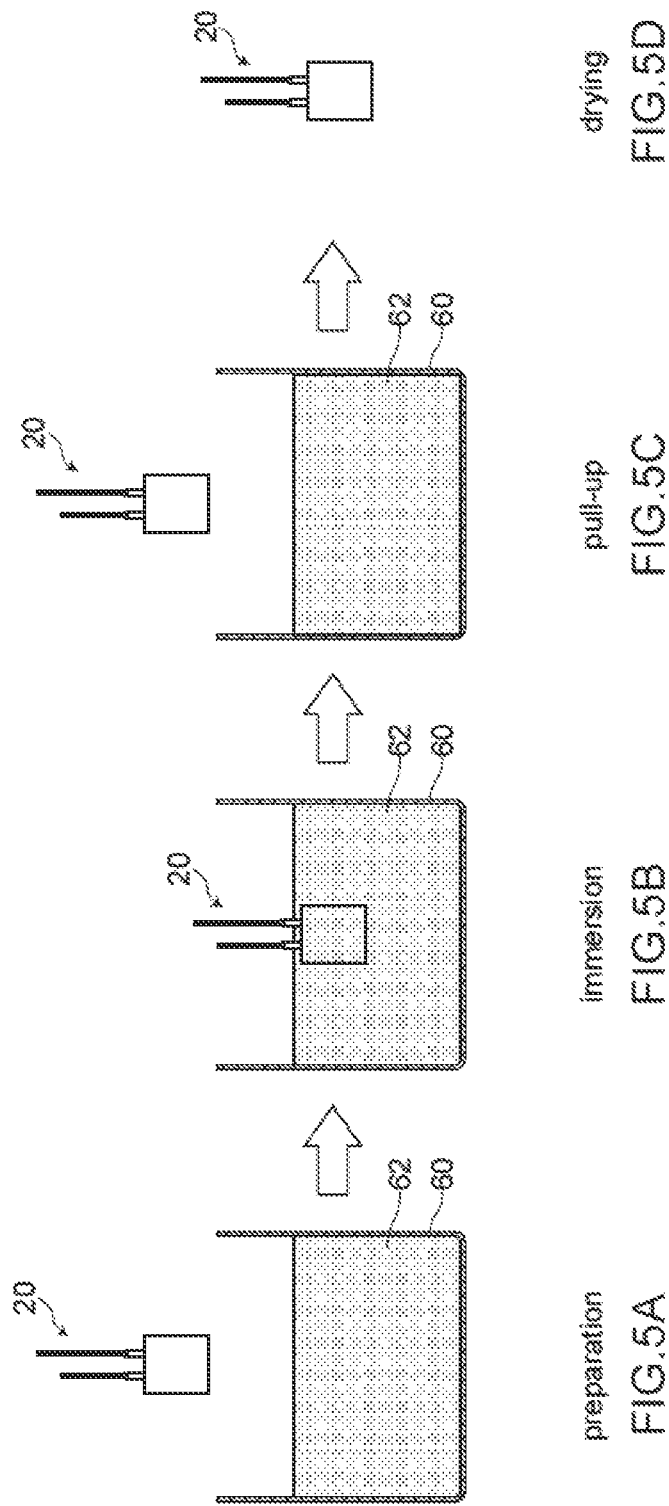

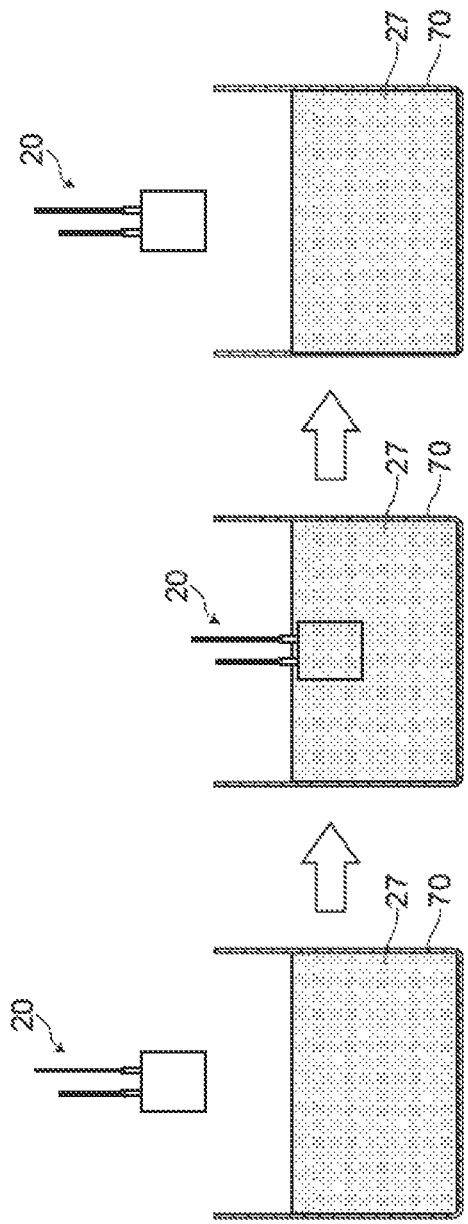

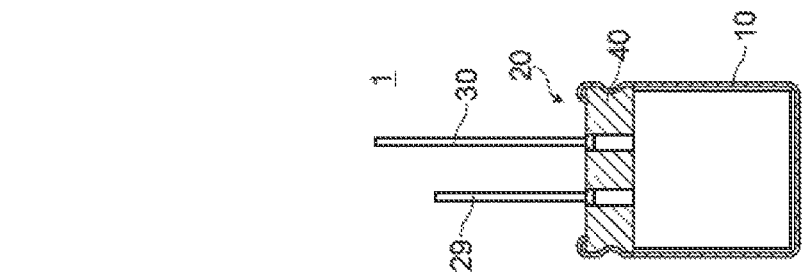
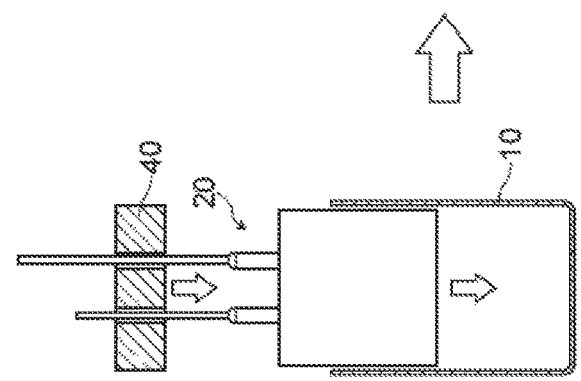
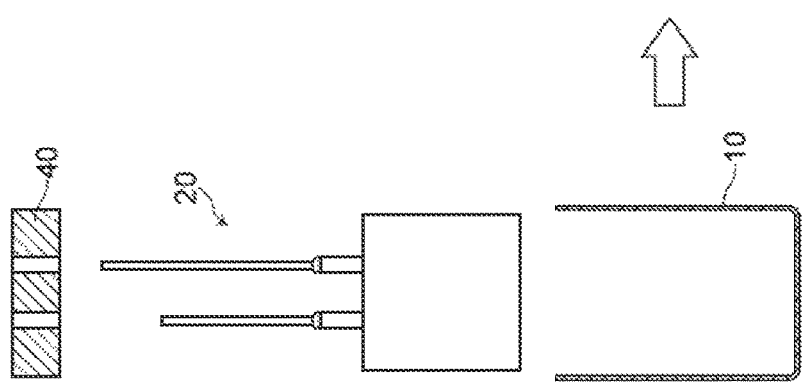

| kind | water-soluble high-molecular weight compound solution [wt%] | | | | | leakage current [μA/25V] | | | expansion | | | |
|---|---|---|---|---|---|---|---|---|---|---|---|---|
| | water-soluble high-molecular weight compound | | | water | nitrobenzyl alcohol | | | | after reflow | | after long-time use | |
| | PEG600 | PEG300 | PEG200 | | | initial period | after reflow | result of evaluation 1 | result of evaluation 2 | | result of evaluation 3 | |
| comparison example 3 | 100 | 0 | 0 | 0 | 0 | 7.12 | 87.5 | bad | good | | good | |
| comparison example 4 | 0 | 33.0 | 67.0 | 0 | 0 | 6.82 | 50.8 | fair | good | | good | |
| comparison example 5 | 0 | 33.0 | 66.8 | 0.1 | 0.1 | 6.55 | 43.5 | fair | good | | good | |
| comparison example 6 | 0 | 49.75 | 50.0 | 0.2 | 0.05 | 6.86 | 25.0 | good | good | | fair | |
| present invention example 3 | 0 | 33.0 | 66.7 | 0.2 | 0.1 | 6.94 | 29.0 | good | good | | good | |
| present invention example 4 | 0 | 49.4 | 50.0 | 0.5 | 0.1 | 7.02 | 27.2 | good | good | | good | |
| present invention example 5 | 66.2 | 0 | 33.0 | 0.5 | 0.3 | 6.95 | 23.0 | good | good | | good | |
| present invention example 6 | 0 | 33.0 | 65.5 | 1.0 | 0.5 | 6.76 | 16.9 | good | good | | good | |
| present invention example 7 | 0 | 31.0 | 66.0 | 2.0 | 1.0 | 5.96 | 13.2 | good | good | | good | |
| present invention example 8 | 32.0 | 31.0 | 32.0 | 3.0 | 2.0 | 6.23 | 12.6 | good | good | | good | |
| present invention example 9 | 0 | 46.0 | 47.0 | 4.0 | 3.0 | 6.15 | 11.8 | good | good | | good | |
| present invention example 10 | 0 | 31.0 | 60.0 | 4.0 | 5.0 | 6.38 | 12.5 | good | good | | good | |
| present invention example 11 | 0 | 31.0 | 55.0 | 4.0 | 10.0 | 5.88 | 11.9 | good | good | | good | |
| comparison example 7 | 0 | 46.0 | 46.0 | 5.0 | 3.0 | 5.86 | 12.2 | good | bad | | bad | |
| comparison example 8 | 0 | 42.5 | 42.5 | 5.0 | 10.0 | 5.93 | 13.3 | good | bad | | fair | |

FIG.10

SOLID ELECTROLYTIC CAPACITOR AND MANUFACTURING METHOD THEREOF

RELATED APPLICATIONS

The present application claims priority to Japanese Patent Application Nos. 2016-155712 filed Aug. 8, 2016 and 2017-134229 filed Jul. 8, 2017, the disclosure of which are hereby incorporated by references herein in their entirety.

BACKGROUND OF THE INVENTION

1. Field of the Invention

The present invention relates to a solid electrolytic capacitor and a manufacturing method thereof.

2. Description of the Related Art

Conventionally, there has been known a solid electrolytic capacitor where a solid electrolyte formed of a conductive high-molecular weight compound in a fine particle form and a water-soluble high-molecular weight compound in a liquid form are introduced into a gap formed between an anode foil and a cathode foil in such a manner that the water-soluble high-molecular weight compound surrounds the solid electrolyte (see JP-A-2016-76680, for example). In this specification, "gap formed between an anode foil and a cathode foil" means not only "a gap formed between an anode foil and a separator and a gap formed between a cathode foil and the separator" but also "gaps formed between fibers in the separator". "gap formed between an anode foil and a cathode foil" also includes "gaps formed in etching pits (recessed portions) formed on a surface of the anode foil or the cathode foil roughened by etching treatment".

In the conventional solid electrolytic capacitor, a water-soluble high-molecular weight compound in a liquid form is introduced into the gap formed between the anode foil and the cathode foil. Accordingly, even when a defect occurs in an oxide film in a step of preparing a solid electrolytic capacitor, it is possible to use moisture which the water-soluble high-molecular weight compound retains to repair the defect thus providing a solid electrolytic capacitor having a high breakdown strength and a low leakage current.

According to the conventional solid electrolytic capacitor, a water-soluble high-molecular weight compound in a liquid form is introduced into a gap formed between the anode foil and the cathode foil. With such a configuration, even when a defect occurs in an oxide film in the course of using the solid electrolytic capacitor for a long time, the moisture which the water-soluble high-molecular weight compound retains can be used for repairing the defect. Accordingly, it is possible to provide a solid electrolytic capacitor having a long lifetime.

According to the conventional solid electrolytic capacitor, the water-soluble high-molecular weight compound in a liquid form is introduced into the gap formed between the anode foil and the cathode foil such that the water-soluble high-molecular weight compound surrounds the solid electrolyte and hence, a dopant of a strong acid which may be liberated from the solid electrolyte is prevented from being in contact with fibers of the separator whereby a deterioration reaction of the separator by the dopant can be suppressed. As a result, the conventional solid electrolytic capacitor is also a solid electrolytic capacitor having a long lifetime from this point of view.

As a result, the conventional solid electrolytic capacitor is considered as a solid electrolytic capacitor having a high breakdown strength, a low leakage current and a long lifetime.

SUMMARY OF INVENTION

Technical Problem

In the technical field of capacitors, there has been a constant demand for a capacitor having a low leakage current compared to conventional solid electrolytic capacitors. The technical field of solid electrolytic capacitors is not the exception.

The present invention has been made in view of the above-mentioned circumstances, and it is an object of the present invention to provide a solid electrolytic capacitor having a low leakage current compared to conventional solid electrolytic capacitors. It is another object of the present invention to provide a method of manufacturing a solid electrolytic capacitor for manufacturing such a solid electrolytic capacitor.

Solution to Problem

Inventors of the present invention have made extensive studies to achieve the above-mentioned object, and have found out that, with the use of a water-soluble high-molecular weight compound solution (see a water-soluble high-molecular weight compound solution 27 shown in FIG. 2A described later) which is formed of a water-soluble high-molecular weight compound in a liquid form, water and alcohol having a nitro group in place of a water-soluble high-molecular weight compound in a liquid form (see a water-soluble high-molecular weight compound 28 in a liquid form shown in FIG. 2B described later), even when a defect occurs in a oxide film of a solid electrolytic capacitor, such a defect can be repaired more efficiently than a prior art, and have completed the present invention. The present invention provides a solid electrolytic capacitor and a method of manufacturing a solid electrolytic capacitor described below.

[1] According to one aspect of the present invention, there is provided a solid electrolytic capacitor which includes: an anode foil having a surface on which an oxide film is formed; a cathode foil; and a separator disposed between the anode foil and the cathode foil, wherein a solid electrolyte made of a conductive high-molecular weight compound in a fine particle form and a water-soluble high-molecular weight compound solution which is formed of three components, a water-soluble high-molecular weight compound in a liquid form, water and alcohol having a nitro group, are introduced into a gap formed between the anode foil and the cathode foil in a state where the water-soluble high-molecular weight compound solution surrounds the solid electrolyte.

According to the solid electrolytic capacitor of the present invention, a water-soluble high-molecular weight compound solution which contains "water" in addition to a water-soluble high-molecular weight compound in a liquid form is introduced into the gap formed between the anode foil and the cathode foil. Accordingly, even when a defect occurs in an oxide film in the course of manufacturing the solid electrolytic capacitor, moisture derived from "water" can be used for repairing the defect in addition to moisture which a water-soluble high-molecular weight compound retains. As a result, the solid electrolytic capacitor of the present invention becomes a solid electrolytic capacitor having lower density of defects in an oxide film than a conventional solid electrolytic capacitor and having a lower leakage current than the conventional solid electrolytic capacitor.

According to the solid electrolytic capacitor of the present invention, a water-soluble high-molecular weight compound solution which contains "water" is introduced into the gap formed between the anode foil and the cathode foil in addition to a water-soluble high-molecular weight compound in a liquid form. Accordingly, even when a defect occurs in an oxide film in the course of using the solid electrolytic capacitor for a long time, moisture derived from "water" can be used for repairing the defect in addition to moisture which a water-soluble high-molecular weight compound retains. As a result, the solid electrolytic capacitor of the present invention becomes a solid electrolytic capacitor having lower density of defects in an oxide film than a conventional solid electrolytic capacitor after the solid electrolytic capacitor is used for a long time and having a longer lifetime than the conventional solid electrolytic capacitor.

According to the solid electrolytic capacitor of the present invention, a water-soluble high-molecular weight compound solution which contains "water" is introduced into the gap formed between the anode foil and the cathode foil in addition to a water-soluble high-molecular weight compound in a liquid form. Accordingly, repairing of defects is more actively performed than in a prior art so that a large amount of hydrogen gas is generated. As a result, pressure in the solid electrolytic capacitor is increased so that when the solid electrolytic capacitor is placed in a high temperature environment (for example, at the time of performing reflow) or when the solid electrolytic capacitor is used for a long time, it is considered that the solid electrolytic capacitor is likely to expand.

However, according to the solid electrolytic capacitor of the present invention, a nitro group in "alcohol having a nitro group" contained in a water-soluble high-molecular weight compound solution absorbs a hydrogen gas so that the increase in pressure in the solid electrolytic capacitor is suppressed. Accordingly, as can be clearly understood from test examples described later, even when the solid electrolytic capacitor is placed in a high temperature environment (for example, at the time of performing reflow) or even when solid electrolytic capacitor is used for a long time, the solid electrolytic capacitor minimally expands.

According to the solid electrolytic capacitor of the present invention, excellent mutual solubility can be acquired between "alcohol having a nitro group" and water thus giving rise to an advantageous effect where a uniform water-soluble high-molecular weight compound solution can be produced.

In general, alcohol is a compound having a hydroxyl group which is not directly linked to an aromatic ring, and the same definition is adopted in the present invention. That is, "alcohol having a nitro group" includes none of the following: nitrophenol, dinitrophenol, trinitrophenol, amino nitrophenol, hydroxy dinitrobenzene, dihydroxy nitrobenzene, hydroxy nitroanisole, a hydroxy nitrobenzene carboxylic acid, a dihydroxy nitrobenzene carboxylic acid or the like.

In the solid electrolytic capacitor according to the present invention, it is preferable that "alcohol having a nitro group" do not belong to phenols. In phenols, hydrogen ions (protons) are easily dissociated from a hydroxyl group. Accordingly, assuming a case where a water-soluble high-molecular weight compound solution is formed using such a hydroxyl compound, the water-soluble high-molecular weight compound solution becomes acidic so that pH becomes excessively low. As a result, metal (aluminum, for example) which forms an anode foil or a cathode foil is degraded or dissolved thus easily deteriorating properties of a solid electrolytic capacitor.

[2] In the solid electrolytic capacitor according to the present invention, it is preferable that the alcohol having a nitro group be aromatic alcohol having a nitro group.

Aromatic alcohol having a nitro group has high heat resistant property and hence, aromatic alcohol can exhibit stable hydrogen gas absorption ability over a long period even at a high temperature. As a result, it is possible to effectively obtain an advantageous effect where the solid electrolytic capacitor minimally expands when the solid electrolytic capacitor is placed in a high temperature environment (for example, at the time of performing reflow) or when the solid electrolytic capacitor is used for a long time.

In general, aromatic alcohol is an aromatic compound having a hydroxyl group which is not directly linked to an aromatic ring such as benzyl alcohol. The same definition is also adopted in the present invention.

In the solid electrolytic capacitor according to the present invention, it is preferable that the alcohol having a nitro group be alcohol having no carboxyl group. When the alcohol having a nitro group is alcohol having a carboxyl group, hydrogen ions (protons) are more easily dissociated compared to the case where the alcohol having a nitro group is alcohol having no carboxyl group. Accordingly, assuming that a water-soluble high-molecular weight compound solution is formed by using such alcohol having a carboxyl group, the water-soluble high-molecular weight compound solution becomes acidic and hence, pH becomes excessively low. As a result, metal (aluminum, for example) which forms an anode foil or a cathode foil is degraded or dissolved thus easily deteriorating properties of a solid electrolytic capacitor.

In the solid electrolytic capacitor according to the present invention, it is preferable that the alcohol having a nitro group be primary alcohol. Hydrogen ions are minimally dissociated from a hydroxyl group in "primary alcohol" compared to "a hydroxy compound where a hydroxyl group is directly linked to a benzene ring" and hence, there is no possibility that pH of a water-soluble high-molecular weight compound solution becomes excessively low. As a result, there is no possibility that metal (aluminum, for example) which forms an anode foil or a cathode foil is degraded or dissolved so that there is no possibility that properties of a solid electrolytic capacitor are easily degraded.

In the solid electrolytic capacitor according to the present invention, it is preferable that the alcohol having a nitro group be neutral alcohol. Unlike acidic alcohol and basic alcohol, there is no possibility that neutral alcohol degrades or resolves metal (aluminum, for example) which forms an anode foil or a cathode foil. Accordingly, by adopting such neutral alcohol as the alcohol having a nitro group, in the solid electrolytic capacitor, there is no possibility that metal (aluminum, for example) which forms an anode foil or a cathode foil is degraded or dissolved so that properties of a solid electrolytic capacitor are easily degraded.

In the solid electrolytic capacitor according to the present invention, it is preferable that the water-soluble high-molecular weight compound solution be "a water-soluble high-molecular weight compound solution where pH of an aqueous solution obtained by mixing the water-soluble high-molecular weight compound solution and pure water falls within a range of from 3.5 to 9". By adopting such a water-soluble high-molecular weight compound solution as the water-soluble high-molecular weight compound solution, in the solid electrolytic capacitor, there is no possibility that metal (aluminum, for example) which forms an anode foil or a cathode foil is degraded or dissolved so that properties of a solid electrolytic capacitor are easily degraded.

The reason the water-soluble high-molecular weight compound solution preferably be "a water-soluble high-molecular weight compound solution where pH of the aqueous solution falls within a range of from 3.5 to 9" is as follows. That is, when the water-soluble high-molecular weight compound solution is "a water-soluble high-molecular weight compound solution where pH of the aqueous solution is lower than 3.5", pH of the water-soluble high-molecular weight compound solution becomes excessively low so that metal (aluminum, for example) which forms an anode foil or a cathode foil in the solid electrolytic capacitor is easily degraded or dissolved. On the other hand, when the water-soluble high-molecular weight compound solution is "a water-soluble high-molecular weight compound solution where pH of the aqueous solution is higher than 9", pH of the water-soluble high-molecular weight compound solution becomes excessively high so that metal (aluminum, for example) which forms an anode foil or a cathode foil in the solid electrolytic capacitor is easily degraded or dissolved in the same manner. From these points of view, it is more preferable that the water-soluble high-molecular weight compound solution be "a water-soluble high-molecular weight compound solution where pH of the aqueous solution falls within a range of from 4 to 7.5", and it is still more preferable that the water-soluble high-molecular weight compound solution be "a water-soluble high-molecular weight compound solution where pH of the aqueous solution falls within a range of from 5 to 7".

In the present invention, it is assumed that pH of the aqueous solution is pH when pH of an aqueous solution (100 parts by weight) obtained by mixing the water-soluble high-molecular weight compound solution (5 parts by weight) and separately prepared pure water (95 parts by weight) at a temperature of 25° C. is measured by a pH meter.

[3] In the solid electrolytic capacitor according to the present invention, it is preferable that the content of the water in the water-soluble high-molecular weight compound solution be set to a value which falls within a range of from 0.2 wt % to 4 wt %, and the content of the alcohol having a nitro group in the water-soluble high-molecular weight compound solution be set to a value which falls within a range of from 0.1 wt % to 10 wt %.

The reason the content of water in the water-soluble high-molecular weight compound solution is set to a value which falls within a range of from 0.2 wt % to 4 wt % is as follows. That is, when the content of water in the water-soluble high-molecular weight compound solution is lower than 0.2 wt %, there may be a case where a defect repair efficiency cannot be sufficiently increased. On the other hand, when the content of water in the water-soluble high-molecular weight compound solution is higher than 4 wt %, when the solid electrolytic capacitor is placed in a high temperature environment (for example, at the time of performing reflow) or when the solid electrolytic capacitor is used for a long time, the solid electrolytic capacitor easily expands. From these points of view, it is more preferable that the content of water in the water-soluble high-molecular weight compound solution be equal to or more than 0.5 wt %, and it is still more preferable that the content of water in the water-soluble high-molecular weight compound solution be set equal to or more than 0.7 wt %. On the other hand, it is more preferable that the content of water in the water-soluble high-molecular weight compound solution be set equal to or less than 3 wt %, and it is still more preferable that the content of water in the water-soluble high-molecular weight compound solution be set equal to or less than 2 wt %.

The reason the content of alcohol having a nitro group in the water-soluble high-molecular weight compound solution is set to a value which falls within a range of from 0.1 wt % to 10 wt % is as follows. That is, when the content of alcohol having a nitro group in the water-soluble high-molecular weight compound solution is lower than 0.1 wt %, there may be a case where a hydrogen gas cannot be sufficiently absorbed. On the other hand, when the content of alcohol having a nitro group in the water-soluble high-molecular weight compound solution is higher than 10 wt %, there is a possibility that crystals precipitate at a low temperature so that stability of the water-soluble high-molecular weight compound solution is impaired. From these points of view, it is more preferable that the content of alcohol having a nitro group in the water-soluble high-molecular weight compound solution be set equal to or more than 0.2 wt %, and it is still more preferable that the content of alcohol having a nitro group in the water-soluble high-molecular weight compound solution be set equal to or more than 0.3 wt %. On the other hand, it is more preferable that the content of alcohol having a nitro group in the water-soluble high-molecular weight compound solution be set equal to or less than 5 wt %, and it is still more preferable that the content of alcohol having a nitro group in the water-soluble high-molecular weight compound solution be set equal to or less than 2 wt %.

[4] In the solid electrolytic capacitor according to the present invention, it is preferable that a ratio of the solid electrolyte which occupies in the gap be set to a value which falls within a range of from 1 vol % to 30 vol %, and a ratio of the water-soluble high-molecular weight compound solution which occupies in the gap be set to a value which falls within a range of from 10 vol % to 99 vol %.

The reason the ratio of the solid electrolyte which occupies in the gap is set to a value which falls within a range of from 1 vol % to 30 vol % is as follows. That is, when the ratio of the solid electrolyte which occupies in the gap is smaller than 1 vol %, an equivalent series resistance (ESR) of resistance components of the capacitor becomes large. On the other hand, when the ratio of the solid electrolyte which occupies in the gap is larger than 30 vol %, in steps of preparing the solid electrolytic capacitor, the gap is liable to be clogged by the solid electrolyte so that the manufacture of the solid electrolytic capacitor becomes difficult. From this viewpoint, it is more preferable that the ratio of the solid electrolyte which occupies in the gap be set to 1.5 vol % or more, and it is still more preferable that the ratio of the solid electrolyte which occupies in the gap be set to 2 vol % or more. On the other hand, it is more preferable that the ratio of the solid electrolyte which occupies in the gap be set to 25 vol % or less, and it is still more preferable that the ratio of the solid electrolyte which occupies in the gap be set to 20 vol % or less.

The reason the ratio of the water-soluble high-molecular weight compound solution which occupies in the gap is set to a value which falls within a range of from 10 vol % to 99 vol % is as follows. That is, when the ratio of the water-soluble high-molecular weight compound solution which occupies in the gap is smaller than 10 vol %, a defect which occurs in an oxide film and the water-soluble high-molecular weight compound solution are minimally brought into contact with each other and hence, there may be a case where the damage is not efficiently repaired. On the other hand, when the ratio of the water-soluble high-molecular weight compound solution which occupies in the gap is larger than 99 vol %, the ratio of the solid electrolyte which occupies in the gap becomes low and hence, there may be a case where equivalent series resistance (ESR) of resistance components of the capacitor becomes high. From this viewpoint, it is more preferable that the ratio of the water-soluble high-molecular weight compound solution which occupies in the gap be equal to or more than 20 vol %, and it is still more preferable that the ratio of the water-soluble high-molecular weight compound solution which occupies in the gap be equal to or more than 30 vol %. Further, it is more preferable that the ratio of the water-soluble high-molecular weight compound solution which occupies in the gap be equal to or less than 96 vol %, and it is still more preferable that the ratio of the water-soluble high-molecular weight compound solution which occupies in the gap be equal to or less than 90 vol %.

[5] In the solid electrolytic capacitor of the present invention, it is preferable that an average particle size of the conductive high-molecular weight compound be set to a value which falls within a range of from 1 nm to 300 nm.

The reason an average particle size of the conductive high-molecular weight compound is set to a value which falls within a range of from 1 nm to 300 nm is as follows. That is, when the average particle size of the conductive high-molecular weight compound is less than 1 nm, there may be a case where the manufacture of the conductive high-molecular weight compound becomes difficult. On the other hand, when the average particle size of the conductive high-molecular weight compound is larger than 300 nm, there may be a case where it is difficult to introduce a conductive high-molecular weight compound into etching pits (recessed portions) formed on a surface of the anode foil. From this viewpoint, it is more preferable that the average particle size of the conductive high-molecular weight compound be set to 2 nm or more, and it is still more preferable that the average particle size of the conductive high-molecular weight compound be set to 3 nm or more. It is more preferable that the average particle size of conductive high-molecular weight compound be set to 200 nm or less, and it is still more preferable that average particle size of conductive high-molecular weight compound be set to 100 nm or less.

[6] In the solid electrolytic capacitor of the present invention, it is preferable that the water-soluble high-molecular weight compound be a mixed material made of two or more kinds of water-soluble high-molecular weight compounds having different molecular weights.

In providing the solid electrolytic capacitor which contains a water-soluble high-molecular weight compound solution, from a view point of lowering an equivalent series resistance (ESR) at a low temperature, it is preferable to use a water-soluble high-molecular weight compound having a small molecular weight as a water-soluble high-molecular weight compound. The reason is as follows. A high molecule having a large molecular weight starts the solidification thereof at a low temperature of 10° C. or below and, at the time of starting the solidification, a network of the solid electrolyte is broken thus causing the increase of an ESR of the solid electrolytic capacitor. On the other hand, a water-soluble high-molecular weight compound having a small molecular weight has a lower solidification point than a water-soluble high-molecular weight compound having a large molecular weight and hence, when the solid electrolytic capacitor which uses a water-soluble high-molecular weight compound having a small molecular weight is brought into a low temperature state, a water-soluble high-molecular weight compound is minimally solidified so that the network of the solid electrolytes formed of a conductive high-molecular weight compound in a fine particle form is minimally broken. Accordingly, it is possible to suppress the increase of an equivalent series resistance (ESR) thus providing a solid electrolytic capacitor having an excellent low temperature resistance property.

However, a water-soluble high-molecular weight compound having a small molecular weight has a property where such a water-soluble high-molecular weight compound easily passes through a sealing member and hence, when the water-soluble high-molecular weight compound is used singly, there may be a case where the retention of a water-soluble high-molecular weight compound solution over a long period becomes difficult. By taking into account such a case, in the present invention, two or more kinds of water-soluble high-molecular weight compounds having different molecular weights are used as a water-soluble high-molecular weight compound. In this case, with the use of a water-soluble high-molecular weight compound having a small molecular weight and a water-soluble high-molecular weight compound having a larger molecular weight than the water-soluble high-molecular weight compound having a small molecular weight in mixture, a solidification stress at the time of low temperature can be alleviated so that the solid electrolytic capacitor can acquire both an effect of lowering an equivalent series resistance (ESR) at a low temperature and an effect of making a water-soluble high-molecular weight compound solution minimally pass through a sealing member and scatter to the outside. As a result, the solid electrolytic capacitor of the present invention provides a solid electrolytic capacitor having a favorable low temperature resistance property and a long lifetime.

[7] In the solid electrolytic capacitor of the present invention, it is preferable that the water-soluble high-molecular weight compound be polyalkylene oxide, water-soluble silicone, branched polyether or derivatives of these materials.

All of the above-mentioned water-soluble high-molecular weight compounds have a large number of oxygen atoms and therefore have a high oxidizing ability. Accordingly, by adopting the above-mentioned configurations, even when a defect occurs in an oxide film in the case where the solid electrolytic capacitor is used for a long time, a high oxidizing ability which the above-mentioned water-soluble high-molecular weight compound has can be used to repair the defect and hence, the solid electrolytic capacitor of the present invention can provide a solid electrolytic capacitor having a longer lifetime.

[8] A method of manufacturing a solid electrolytic capacitor of the present invention includes: a first step of preparing a capacitor element which includes an anode foil having a surface on which an oxide film is formed, a cathode foil, and a separator arranged between the anode foil and the cathode foil; a second step of introducing a solid electrolyte made of a conductive high-molecular weight compound in a fine particle form into a gap formed between the anode foil and the cathode foil; and a third step of introducing a water-soluble high-molecular weight compound solution which is formed of a water-soluble high-molecular weight compound in a liquid form, water and alcohol having a nitro group in the gap formed between the anode foil and the cathode foil such that the water-soluble high-molecular weight compound solution surrounds the solid electrolyte in this order.

According to the method of manufacturing a solid electrolytic capacitor of the present invention, it is possible to manufacture the solid electrolytic capacitor of the present invention having the above-mentioned excellent properties.

[9]

In the method of manufacturing a solid electrolytic capacitor according to the present invention, it is preferable to use, as the water-soluble high-molecular weight compound solution, a water-soluble high-molecular weight compound solution which is prepared by adding the water and the alcohol having a nitro group into the water-soluble high-molecular weight compound.

By adopting such a method, it is possible to easily prepare the water-soluble high-molecular weight compound solution.

[10] In the method of manufacturing a solid electrolytic capacitor of the present invention, it is preferable that, in the second step, a conductive high-molecular weight compound dispersion liquid in which the conductive high-molecular weight compound is dispersed in a solvent be filled in the gap using a vacuum impregnation method or an immersion impregnation method and, thereafter, the solvent be removed from the gap thus introducing the solid electrolyte into the gap, and in the third step, the water-soluble high-molecular weight compound solution be introduced into the gap using the vacuum impregnation method or the immersion impregnation method.

By adopting such a method, it is possible to easily introduce a predetermined amount of solid electrolyte into an extremely narrow gap formed between the anode foil and the cathode foil and it is also possible to easily introduce a predetermined amount of water-soluble high-molecular weight compound solution into an extremely narrow gap formed between the anode foil and the cathode foil.

It is preferable that the method of manufacturing a solid electrolytic capacitor according to the present invention also have the technical features of the above-mentioned solid electrolytic capacitor of the present invention in the same manner.

In this specification, the water-soluble high-molecular weight compound solution may be also referred to as a water-soluble high-molecular weight compound liquid. The conductive high-molecular weight compound dispersion liquid may be also referred to as a conductive high-molecular weight compound dispersed solution. The water-soluble high-molecular weight compound solution may be also referred to as a water-soluble high-molecular weight compound solution which contains a water-soluble high-molecular weight compound in a liquid form, water and alcohol having a nitro group.

BRIEF DESCRIPTION OF DRAWINGS

FIGS. 2A and 2B are views for describing a main part of the solid electrolytic capacitor 1 of the embodiment.

FIGS. 5A to 5D are views for describing the method of manufacturing a solid electrolytic capacitor of the embodiment.

FIGS. 6A to 6C are views for describing the method of manufacturing a solid electrolytic capacitor of the embodiment.

FIGS. 7A to 7C are views for describing the method of manufacturing a solid electrolytic capacitor of the embodiment.

FIG. 10 is a table showing the result of a test example 3.

DESCRIPTION OF PREFERRED EMBODIMENTS

Figure 1B:
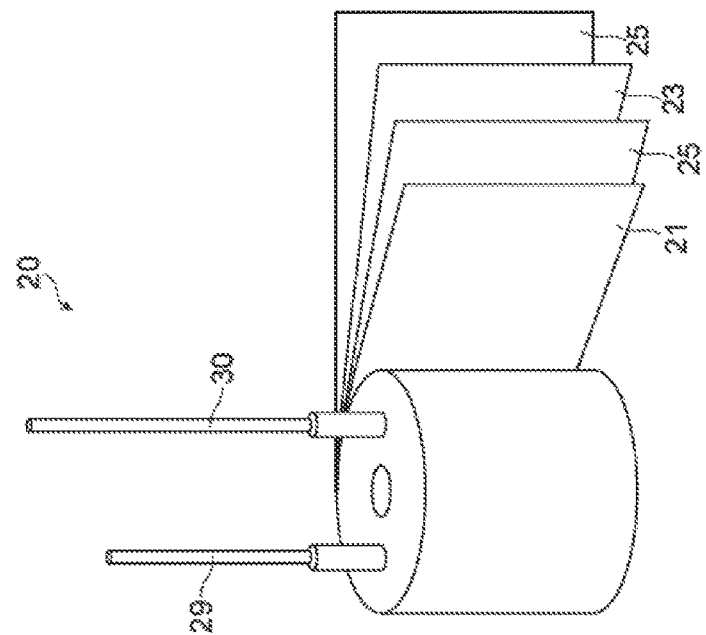
FIGS. 1A and 1B are views for describing a solid electrolytic capacitor 1 of an embodiment.

Hereinafter, a solid electrolytic capacitor and a method of manufacturing thereof according to the present invention are described with respect to embodiments shown in the drawings.

1. Configuration of Solid Electrolytic Capacitor 1 of Embodiment

Figure 1A:
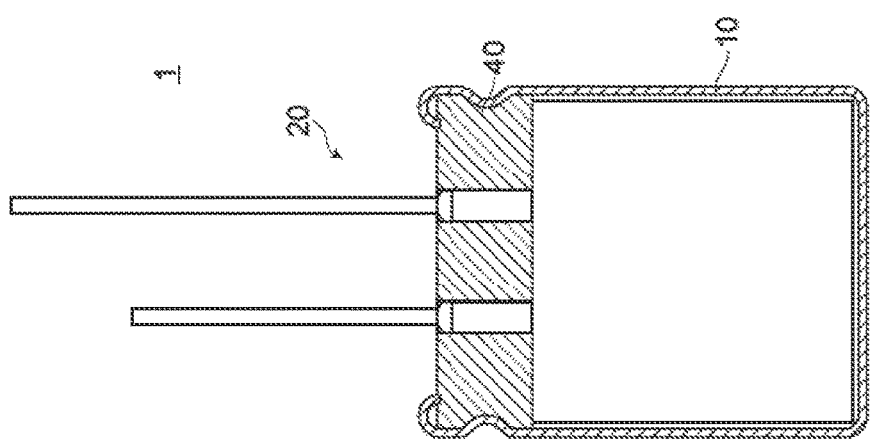

FIGS. 1A and 1B are views for describing the solid electrolytic capacitor 1 of the embodiment. FIG. 1A is a cross-sectional view of the solid electrolytic capacitor 1 of the embodiment, and FIG. 1B is a perspective view of a capacitor element 20.

FIGS. 2A and 2B are views for describing a main part of the solid electrolytic capacitor 1 of the embodiment. FIG. 2A is a cross-sectional view of the main part of the solid electrolytic capacitor 1, and FIG. 2B is a cross-sectional view of a main part of a solid electrolytic capacitor 1a according to a comparison example.

The solid electrolytic capacitor 1 of the embodiment is a winding-type solid electrolytic capacitor. As shown in FIGS. 1A and 1B, the solid electrolytic capacitor 1 includes: a bottomed cylindrical metal case 10; a capacitor element 20; and a sealing member 40.

A bottom surface portion of the metal case 10 has an approximately circular shape, and a valve (not shown in the drawing) is mounted on a portion of the bottom surface portion in the vicinity of the center of the bottom surface portion. Accordingly, the solid electrolytic capacitor 1 is configured such that, when an internal pressure is elevated, the valve is broken so that the internal pressure is released to the outside. A side surface portion of the metal case 10 is raised approximately vertically from an outer edge of the bottom surface portion. An opening portion of the metal case 10 is sealed by a sealing member 40, and two lead lines 29, 30 of the capacitor element 20 are pulled out to the outside through penetration holes formed in the sealing member 40.

The capacitor element 20 is accommodated in the inside of the metal case 10 and, as shown in FIG. 1B and FIG. 2A, includes: an anode foil 21; a cathode foil 23; and a separator 25 disposed or interposed between the anode foil 21 and the cathode foil 23 such that the anode foil 21 and the cathode foil 23 are wound in an overlapping state with the separator 25 interposed therebetween.

The anode foil 21 is made of valve metal such as aluminum, tantalum or niobium. After a surface of the anode foil 21 is roughened by an etching treatment, an oxide film 22 is formed on the surface of the anode foil 21 by a chemical conversion treatment (see FIG. 2A). In the same manner as the anode foil 21, the cathode foil 23 is also made of valve metal such as aluminum, tantalum or niobium. After a surface of the cathode foil 23 is roughened by an etching treatment in the same manner as the anode foil 21, an oxide film 24 is formed on the surface of the cathode foil 23 by natural oxidation. The anode foil 21 is electrically connected with the lead line 29, and the cathode foil 23 is electrically connected with the lead line 30.

A width of the separator 25 is set larger than winding widths of the anode foil 21 and the cathode foil 23, and the separator 25 is overwrapped such that the separator 25 sandwiches the anode foil 21 and the cathode foil 23. The separator 25 may be preferably formed using cellulose fiber having chemical affinity with a conductive high-molecular weight particle and a water-soluble high-molecule or synthetic resin such as nylon, PET, or PPS having excellent heat resistant property, and may be formed using heat resistant cellulose paper or heat resistant flameproof paper, for example.

In the solid electrolytic capacitor 1 of the embodiment formed in this manner, unlike the conventional solid electrolytic capacitor where a solid electrolyte formed of a conductive high-molecular weight compound 26 in a fine particle form and a water-soluble high-molecular weight compound 28 in a liquid form are introduced into a gap formed between an anode foil 21 and a cathode foil 23 in such a manner that the water-soluble high-molecular weight compound 28 in a liquid form surrounds the solid electrolyte (See FIG. 2B), a solid electrolyte made of a conductive high-molecular weight compound 26 in a fine particle form and a water-soluble high-molecular weight compound solution 27 which is formed of a water-soluble high-molecular weight compound in a liquid form, water and alcohol having a nitro group are introduced into a gap formed between the anode foil 21 and the cathode foil 23 in a state where the water-soluble high-molecular weight compound solution 27 surrounds the solid electrolyte (see FIG. 2A).

The conductive high-molecular weight compound is formed of polyethylenedioxythiophene, polythiophene, polypyrrole or polyaniline.

The solid electrolyte may be an electrolyte which further contains a dopant selected from a group consisting of a polystyrene sulfonic acid, a toluene sulfonic acid, an alkylbenzene sulfonic acid and a naphthalene sulfonic acid.

The water-soluble high-molecular weight compound is polyalkylene oxide, water-soluble silicone, branched polyether or derivatives of these materials. For example, the water-soluble high-molecular weight compound is polyethylene glycol (PEG). A molecular weight of the water-soluble high-molecular weight compound is set to a value which falls within a range of from 100 to 1000, and is 300, for example. Further, the water-soluble high-molecular weight compound may be a mixed body formed of two or more kinds of water-soluble high-molecular weight compounds having different molecular weights. For example, the water-soluble high-molecular weight compound may be a mixed body of polyethylene glycol having a molecular weight of 300 (hereinafter referred to as "PEG300") and polyethylene glycol having a molecular weight of 200 (hereinafter referred to as "PEG200").

Alcohols having various kinds of nitro groups can be used as alcohol having a nitro group. In this embodiment, however, it is preferable to use aromatic alcohol having a nitro group (nitrobenzyl alcohol, for example). Further, in this embodiment, it is preferable that alcohol having a nitro group be alcohol having no carboxyl group. It is also preferable that alcohol having a nitro group be primary alcohol. It is also preferable that alcohol having a nitro group be neutral alcohol.

In this embodiment, it is preferable that the water-soluble high-molecular weight compound solution 27 be "water-soluble high-molecular weight compound solution where pH of an aqueous solution obtained by mixing the water-soluble high-molecular weight compound solution 27 and water fall within a range of from 3.5 to 9".

The content of the water in the water-soluble high-molecular weight compound solution 27 is set to a value which falls within a range of from 0.2 wt % to 4 wt %, and the content of the alcohol having a nitro group in the water-soluble high-molecular weight compound solution 27 is set to a value which falls within a range of from 0.1 wt % to 10 wt %.

A ratio of the solid electrolyte which occupies in the gap falls within a range of from 1 vol % to 30 vol %, and a ratio of the water-soluble high-molecular weight compound solution 27 which occupies in the gap falls within a range of from 10 vol % to 99 vol %. Further, an average particle size of the conductive high-molecular weight compound in a fine particle form is set to a value which falls within a range of from 1 nm to 300 nm (for example, 20 nm).

It is preferable that the sealing member 40 have the following properties. That is, the sealing member 40 possesses high gas tightness for preventing the scattering of a water-soluble high-molecular weight compound solution from the inside to the outside of the solid electrolytic capacitor 1 and the intrusion of a foreign substance (for example, moisture, chloride, fine powder or the like) into the inside of the electrolyte capacitor 1 from the outside. The sealing member 40 has a suitable amount of elasticity for ensuring close contact with the metal case 10 and the lead lines 29, 30. Further, as a material for forming the sealing member 40, it is preferable to select a material which allows the sealing member 40 to maintain properties relating to such gas tightness and elasticity in a high-temperature state as well as in a low-temperature state. As such a material, for example, a rubber material such as ethylene-propylene terpolymer (EPT), isobutylene-isoprene rubber (IIR), EPT-IIR blended rubber, silicone rubber or a rubber composite material formed by laminating a resin such as a phenol resin, an epoxy resin, or a fluororesin and rubber with each other can be preferably used. Among these materials, isobutylene-isoprene rubber (IIR) having excellent gas tightness can be particularly preferably used.

2. Method of Manufacturing Solid Electrolytic Capacitor of Embodiment

Figure 3:
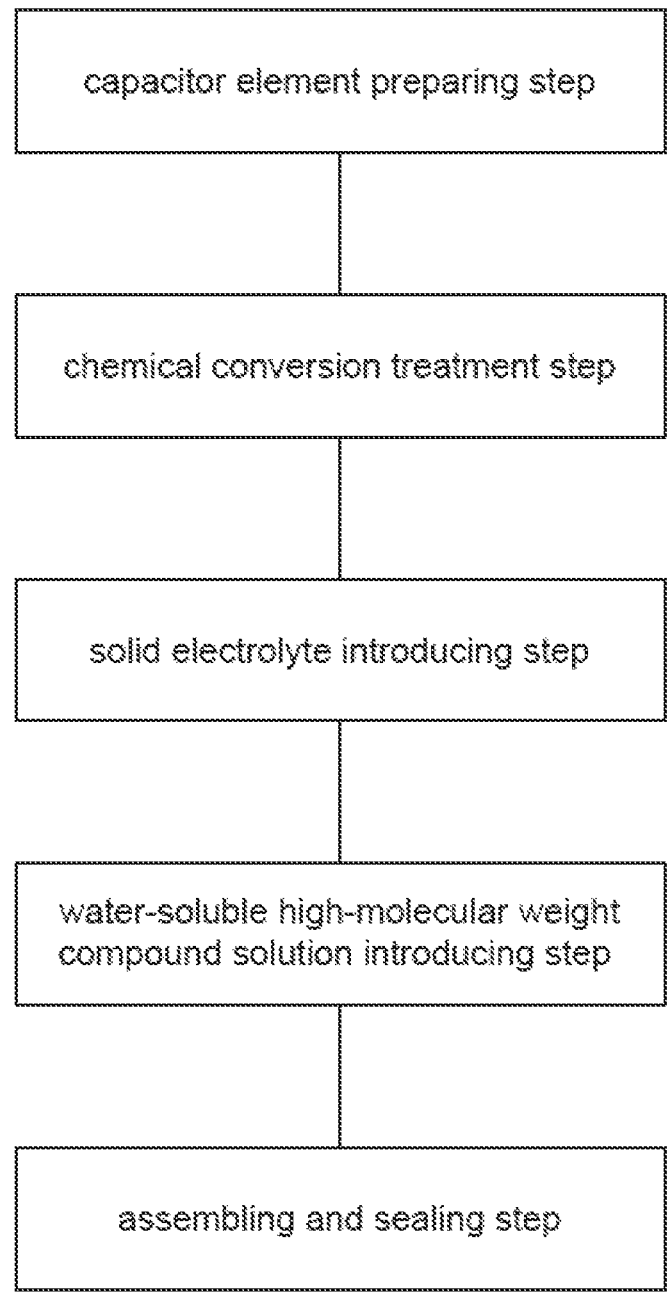
FIG. 3 is a flowchart for describing a method of manufacturing a solid electrolytic capacitor of the embodiment.
Figure 4:
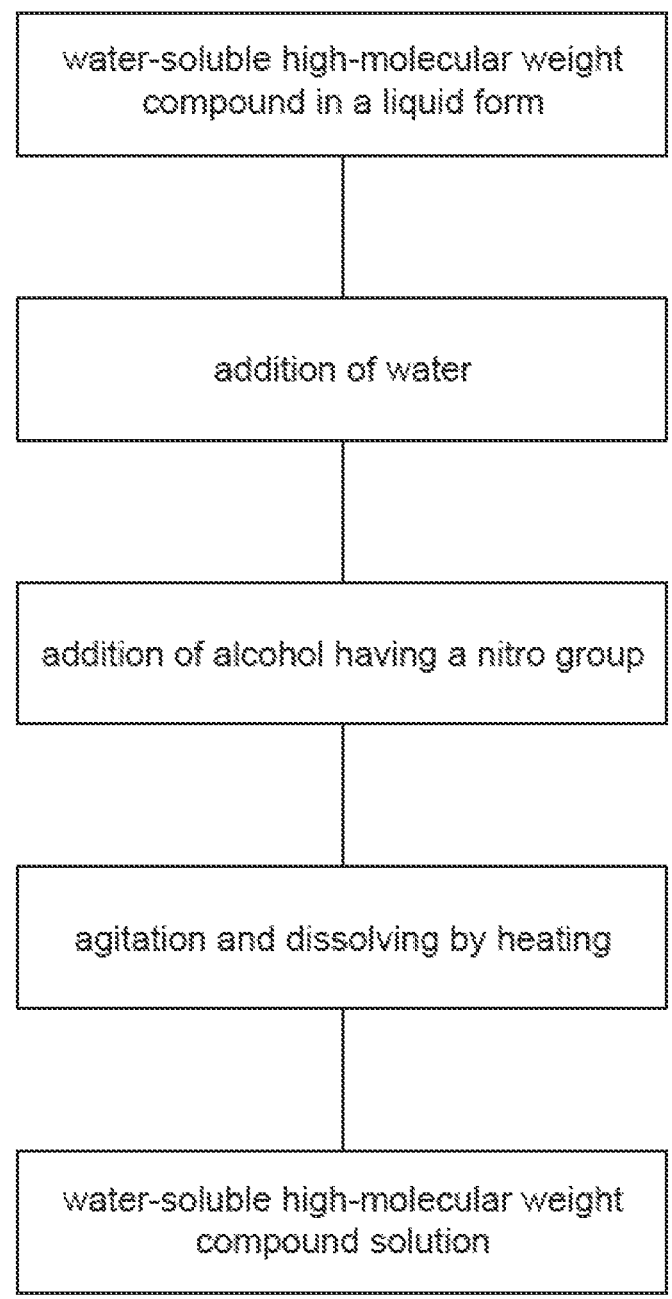
FIG. 4 is a flowchart for describing the method of manufacturing a solid electrolytic capacitor of the embodiment.

The solid electrolytic capacitor 1 of the embodiment can be manufactured in the following manner. FIG. 3 and FIG. 4 are flowcharts for describing the method of manufacturing a solid electrolytic capacitor of the embodiment. In these drawings, FIG. 3 is a flowchart for describing the overall method of manufacturing a solid electrolytic capacitor of the embodiment, and FIG. 4 is a flowchart for describing steps of preparing a water-soluble high molecular weight solution.

FIGS. 5 to 7 are views for describing the method of manufacturing a solid electrolytic capacitor of the embodiment. In these drawings, FIG. 5 is the view for describing a step of introducing a solid electrolyte, FIG. 6 is a view for describing a step of introducing a water-soluble high-molecular weight compound solution, and FIG. 7 is a view for describing an assembling and a sealing step. FIG. 5A to FIG. 5D, FIG. 6A to FIG. 6C and FIG. 7A to FIG. 7C are views showing the respective steps of the method of manufacturing a solid electrolytic capacitor of the embodiment.

As shown in FIG. 3, the method of manufacturing a solid electrolytic capacitor of the embodiment includes; a capacitor element preparation step (first step); a chemical conversion treatment step; a solid electrolyte introducing step (second step); a water-soluble high-molecular weight compound solution introducing step (third step); and an assembling and sealing step in this order. Hereinafter, the method of manufacturing a solid electrolytic capacitor of the embodiment is described in accordance with the respective steps.

(1) Capacitor Element Preparation Step (First Step)

First, a capacitor element which includes an anode foil 21, a cathode foil 23, and a separator 25 disposed between the anode foil 21 and the cathode foil 23 is prepared (see FIG. 1B). An oxide film 22 is formed on the anode foil 21 by applying a predetermined voltage of from 2V to 400V to a surface of an aluminum foil which is roughened by a surface roughening treatment thus performing a chemical conversion treatment to the surface of an aluminum foil. To be more specific, the capacitor element 20 is prepared by winding the anode foil 21 having an uneven surface and having an oxide film 22 formed on the uneven surface and the cathode foil 23 having an uneven surface in an overlapping manner with the separator 25 interposed therebetween. A lead line 29 is connected to the anode foil 21, and a lead line 30 is connected to the cathode foil 23.

(2) Chemical Conversion Treatment Step

Next, the capacitor element 20 is immersed in a chemical solution (aqueous solution of ammonium adipate, ammonium borate, ammonium phosphate, ammonium glutarate, ammonium azelate, ammonium tartrate, ammonium sebacate, ammonium pimelate, ammonium suberate or the like, for example) in a chemical solution tank (not shown in the drawing) and, at the same time, a predetermined voltage (100V, for example) is applied between the lead line 29 on an anode side and the chemical solution for 5 minutes. Due to such a chemical conversion treatment, an oxide film defect portion which exists on an end portion of the anode foil 21 and an oxide film defect portion which may exist in a surface of the anode foil 21 are repaired (not shown in the drawing).

(3) Solid Electrolyte Introducing Step (Second Step)

Next, a solid electrolyte made of a conductive high-molecular weight compound 26 in a fine particle form is introduced into a gap formed between the anode foil 21 and the cathode foil 23 such that a ratio of the solid electrolyte which occupies in the gap is set to a value which falls within a range of from 2 vol % to 30 vol %. In the solid electrolyte introducing step, a conductive high-molecular weight compound dispersion liquid prepared by dispersing the conductive high-molecular weight compound 26 in a solvent is filled in the gap and, thereafter, the solvent is removed from the gap thus introducing the solid electrolyte into the gap.

To be more specific, the solid electrolyte introducing step is performed by an immersion impregnation method. That is, the conductive high-molecular weight compound dispersion liquid 62 prepared by dispersing the conductive high-molecular weight compound 26 in a solvent is filled in a solid electrolyte introducing tank 60 (see FIG. 5A) and, thereafter, the capacitor element 20 is immersed in the conductive high-molecular weight compound dispersion liquid 62 (polymer concentration being set to 2 vol %) (see FIG. 5B). Next, the capacitor element 20 is taken out from the conductive high-molecular weight compound dispersion liquid 62 (see FIG. 5C) and, thereafter, heat treatment is applied to the capacitor element 20 (see FIG. 5D). These steps are repeated twice so as to set a ratio of the solid electrolyte which occupies in the gap to 4 vol %.

The conductive high-molecular weight compound dispersion liquid 62 can be prepared in the following manner. That is, a conductive high-molecular weight compound in a fine particle form made of a conductive high-molecular weight compound (PEDOT polymer, for example) to which a dopant or an emulsifier is added is prepared by applying polymerization (radical polymerization or oxidation polymerization) to a monomer in a suspended state (EDOT monomer, for example), and the conductive high-molecular weight compound in a fine particle form is dispersed in a predetermined solvent so as to prepare the conductive high-molecular weight compound dispersion liquid 62. An average particle size of the conductive high-molecular weight compound can be adjusted by suitably setting a polymerization reaction condition (the concentration of an initiator, a monomer, or a polymerization assistant, a reaction temperature, a stirring condition of a reaction solution or the like, for example). The average particle size of the conductive high-molecular weight compound can be also adjusted by applying a known grinding treatment (stirring grinding treatment, vibratory grinding or the like, for example). A particle size of the conductive high-molecular weight compound can be made uniform by performing a fractionation filtration treatment.

A ratio of the solid electrolyte which occupies in the gap can be increased by increasing the number of times that the above-mentioned operation is repeated or by increasing the polymer concentration in the conductive high-molecular weight compound dispersion liquid 62. On the other hand, a ratio of the solid electrolyte which occupies in the gap can be decreased by decreasing the number of times that the above-mentioned operation is repeated or by decreasing the polymer concentration in the conductive high-molecular weight compound dispersion liquid 62. For example, a ratio of the solid electrolyte which occupies in the gap is decreased to 2% by performing the above-mentioned operation only one time or by decreasing the polymer concentration in the conductive high-molecular weight compound dispersion liquid 62 to 50%. On the other hand, a ratio of the solid electrolyte which occupies in the gap is increased to 6% by performing the above-mentioned operation three times or by increasing the polymer concentration in the conductive high-molecular weight compound dispersion liquid 62 to 150%.

An introducing amount (volume) of a solid electrolyte can be calculated by measuring a weight of a capacitor element in respective states (before immersion and after immersion and drying) and by converting the difference in weight between "before immersion" and "after immersion and drying" into the difference in volume using a density of the solid electrolyte. Accordingly, by measuring and calculating a gap (volume) in the capacitor element before immersion in advance, the ratio of the solid electrolyte which occupies in the gap can be calculated.

(4) Water-Soluble High-Molecular Weight Compound Solution Introducing Step (Third Step)

Next, a water-soluble high-molecular weight compound solution 27 is introduced into a gap formed between the anode foil 21 and the cathode foil 23 in a state where the water-soluble high-molecular weight compound solution 27 surrounds the solid electrolyte and a ratio of the water-soluble high-molecular weight compound solution 27 which occupies in the gap falls within a range of from 10 vol % to 99 vol %. To be more specific, the water-soluble high-molecular weight compound solution introducing step is performed as follows.

(a) Preparation of Water-Soluble High-Molecular Weight Compound Solution

The preparation of water-soluble high-molecular weight compound solution is performed as follows. That is, as shown in FIG. 4, a water-soluble high-molecular weight compound solution is prepared by sequentially adding water and alcohol having a nitro group to a water-soluble high-molecular weight compound in a liquid form which is prepared in advance and, thereafter, by agitating the mixed body. The agitation may be performed at a temperature of 40° C., for example.

(b) Introduction of Water-Soluble High-Molecular Weight Compound Solution

The step of filling the water-soluble high-molecular weight compound solution is performed by an immersion impregnation method. That is, as shown in FIG. 6, a water-soluble high-molecular weight compound solution 27 is introduced into the gap by filling a water-soluble high-molecular weight compound solution 27 in a water-soluble high-molecular weight compound solution introducing tank 70 (see FIG. 6A) and, thereafter, by immersing the capacitor element 20 in the water-soluble high-molecular weight compound solution 27 (see FIG. 6B). Next, the capacitor element 20 is taken out from the water-soluble high-molecular weight compound solution introducing tank 70 (see FIG. 6C) and, thereafter, an introduction amount of the water-soluble high-molecular weight compound solution 27 is set to a predetermined introduction amount (weight) by eliminating a shortage amount or an excessive amount of the water-soluble high-molecular weight compound solution 27 by adjustment.

An introducing amount (volume) of a water-soluble high-molecular weight compound solution 27 can be calculated by measuring a weight of a capacitor element in respective states (before immersion and after immersion) and by converting the difference in weight between "before immersion" and "after immersion" into the difference in volume using a density of the water-soluble high-molecular weight compound solution 27. Accordingly, by measuring and calculating a gap (volume) in the capacitor element before immersion in advance, the ratio of the water-soluble high-molecular weight compound solution 27 which occupies in the gap can be calculated.

(5) Assembling and Sealing Step

Lastly, the sealing member 40 is mounted on the capacitor element 20 (see FIG. 7A), the capacitor element 20 is inserted into the metal case 10 (see FIG. 7B) and, thereafter, the metal case 10 is caulked in the vicinity of an opening end of the metal case 10 (see FIG. 7C). The sealing member 40 is formed by using isobutylene-isoprene rubber (IIR), for example. In place of the isobutylene-isoprene rubber (IIR), a rubber material such as ethylene-propylene terpolymer (EPT), EPT-IIR blended rubber, or silicone rubber or a rubber composite material formed by laminating a resin such as a phenol resin (Bakelite), an epoxy resin, or a fluororesin and rubber with each other may be also used. Thereafter, an aging step is performed by applying a predetermined voltage to the capacitor element 20 under a high temperature atmosphere. In accordance with the above-mentioned steps, the solid electrolytic capacitor 1 according to the embodiment is completed.

3. Advantageous Effects Acquired by Solid Electrolyte Capacitor 1 and Method of Manufacturing the Solid Electrolyte Capacitor 1 According to the Embodiment According to the solid electrolytic capacitor of the embodiment, a water-soluble high-molecular weight compound solution which contains "water" is introduced into the gap formed between the anode foil and the cathode foil in addition to a water-soluble high-molecular weight compound in a liquid form. Accordingly, even when a defect occurs in an oxide film in the course of manufacturing the solid electrolytic capacitor, it is possible to use moisture derived from "water" for repairing the defect in addition to moisture which a water-soluble high-molecular weight compound retains. As a result, the solid electrolytic capacitor of this embodiment becomes a solid electrolytic capacitor having lower density of defects in an oxide film than a conventional solid electrolytic capacitor and having a lower leakage current than the conventional solid electrolytic capacitor.

According to the solid electrolytic capacitor of this embodiment, a water-soluble high-molecular weight compound solution which contains "water" is introduced into the gap formed between the anode foil and the cathode foil in addition to a water-soluble high-molecular weight compound in a liquid form. Accordingly, even when a defect occurs in an oxide film in the course of using the solid electrolytic capacitor for a long time, it is possible to use moisture derived from "water" for repairing the defect in addition to moisture which a water-soluble high-molecular weight compound retains. As a result, the solid electrolytic capacitor of this embodiment becomes a solid electrolytic capacitor having lower density of defects in an oxide film than a conventional solid electrolytic capacitor after the solid electrolytic capacitor is used for a long time and having a longer lifetime than the conventional solid electrolytic capacitor.

According to the solid electrolytic capacitor of this embodiment, a nitro group in "alcohol having a nitro group" contained in a water-soluble high-molecular weight compound solution absorbs a hydrogen gas so that the increase of pressure in the solid electrolytic capacitor is suppressed. Accordingly, as can be clearly understood from test examples described later, even when the solid electrolytic capacitor is placed in a high temperature environment (for example, at the time of performing reflow) or even when solid electrolytic capacitor is used for a long time, the solid electrolytic capacitor minimally expands.

According to the solid electrolytic capacitor of this embodiment, excellent mutual solubility can be acquired between "alcohol having a nitro group" and water thus giving rise to an advantageous effect where a uniform water-soluble high-molecular weight compound solution can be produced.

In the solid electrolytic capacitor according to this embodiment, in "alcohol having a nitro group", hydrogen ions are minimally dissociated from a hydroxyl group so that there is no possibility that pH of a water-soluble high-molecular weight compound solution becomes excessively low. As a result, there is no possibility that metal (aluminum, for example) which forms the anode foil or the cathode foil is degraded or dissolved so that there is no possibility that properties of a solid electrolytic capacitor are easily deteriorated.

In the solid electrolytic capacitor according to this embodiment, there may be a case where alcohol having a nitro group is aromatic alcohol having a nitro group. In this case, aromatic alcohol having a nitro group has high heat resistant property and hence, aromatic alcohol can exhibit stable hydrogen gas absorption ability over a long period even at a high temperature. As a result, it is possible to effectively obtain an advantageous effect where the solid electrolytic capacitor minimally expands when the solid electrolytic capacitor is placed in a high temperature environment (for example, at the time of performing reflow) or when the solid electrolytic capacitor is used for a long time.

In the solid electrolytic capacitor of this embodiment, when the alcohol having a nitro group is alcohol having no carboxyl group, hydrogen ions (protons) are minimally dissociated compared to the case where the alcohol having a nitro group is alcohol having a carboxyl group. Accordingly, there is no possibility that pH of the water-soluble high-molecular weight compound solution becomes excessively low. As a result, there is no possibility that metal (aluminum, for example) which forms the anode foil or the cathode foil is degraded or dissolved so that there is no possibility that properties of a solid electrolytic capacitor is easily deteriorated.

In the solid electrolytic capacitor of this embodiment, when alcohol having a nitro group is primary alcohol, hydrogen ions are minimally dissociated from a hydroxyl group in "primary alcohol" compared to "a hydroxy compound where a hydroxyl group is directly linked to a benzene ring" and hence, there is no possibility that pH of a water-soluble high-molecular weight compound solution becomes excessively low. As a result, there is no possibility that metal (aluminum, for example) which forms the anode foil or the cathode foil is degraded or dissolved so that there is no possibility that properties of a solid electrolytic capacitor are easily degraded.

In the solid electrolytic capacitor according to this embodiment, when the alcohol having a nitro group is neutral alcohol, there is no possibility that neutral alcohol degrades or resolves metal (aluminum, for example) which forms the anode foil or the cathode foil. Accordingly, in the solid electrolytic capacitor, there is no possibility that metal (aluminum, for example) which forms the anode foil or the cathode foil is degraded or dissolved so that properties of a solid electrolytic capacitor are easily degraded.

In the solid electrolytic capacitor according to this embodiment, when the water-soluble high-molecular weight compound solution 27 is "a water-soluble high-molecular weight compound solution where pH of an aqueous solution obtained by mixing the water-soluble high-molecular weight compound solution 27 and pure water falls within a range of from 3.5 to 9 ("preferably within a range of from 4 to 7.5" or "still more preferably within a range of from 5 to 7", in the solid electrolytic capacitor, there is no possibility that metal (aluminum, for example) which forms the anode foil or the cathode foil is degraded or dissolved so that properties of a solid electrolytic capacitor are easily degraded. As described previously, pH of the aqueous solution is pH when pH of an aqueous solution (100 parts by weight) obtained by mixing the water-soluble high-molecular weight compound solution 27 (5 parts by weight) and separately prepared pure water (95 parts by weight) at a temperature of 25° C. is measured by a pH meter.

In the solid electrolytic capacitor according to the embodiment, the content of the water in the water-soluble high-molecular weight compound solution falls within a range of from 0.2 wt % to 4 wt % and hence, a defect repair efficiency can be sufficiently increased and, further, when the solid electrolytic capacitor is placed in a high temperature environment (for example, at the time of performing reflow) or when a solid electrolytic capacitor is used for a long time, the solid electrolytic capacitor minimally expands. Further, in the solid electrolytic capacitor according to the embodiment, the content of the alcohol having a nitro group in the water-soluble high-molecular weight compound solution falls within a range of from 0.1 wt % to 10 wt %. Accordingly, the solid electrolytic capacitor can sufficiently absorb a hydrogen gas and hence, it is possible to prevent the occurrence of a drawback that crystals precipitate at a low temperature so that stability of the water-soluble high-molecular weight compound solution is degraded.

In the solid electrolytic capacitor according to the embodiment, a ratio of the solid electrolyte which occupies in the gap falls within a range of from 1 vol % to 30 vol %. Accordingly, it is possible to prevent the occurrence of a drawback that the ratio of the solid electrolyte which occupies in the gap becomes excessively low so that an equivalent series resistance (ESR) of resistance components of the capacitor becomes large or the occurrence of a drawback that the ratio of the solid electrolyte which occupies in the gap becomes excessively large so that the gap is liable to be clogged by the solid electrolyte in the course of preparing the solid electrolytic capacitor. Further, in the solid electrolytic capacitor according to the embodiment, a ratio of the water-soluble high-molecular weight compound solution which occupies in the gap falls within a range of from 10 vol % to 99 vol %. Accordingly, it is possible to prevent the occurrence of a drawback that the ratio of the water-soluble high-molecular weight compound solution which occupies in the gap becomes excessively low so that a defect of an oxide film and the water-soluble high-molecular weight compound solution are minimally brought into contact with each other or the occurrence of a drawback that the ratio of the solid electrolyte which occupies in the gap becomes excessively large (the ratio of the solid electrolyte becomes excessively low) so that an equivalent series resistance (ESR) of resistance components of the capacitor becomes large.

In the solid electrolytic capacitor of the embodiment, an average particle size of the conductive high-molecular weight compound is set to a value which falls within a range of from 1 nm to 300 nm. Accordingly, there is no possibility of the occurrence of a drawback that the average particle size of the conductive high-molecular weight compound is excessively small so that the manufacture of the conductive high-molecular weight compound becomes difficult. Further, there is no possibility of the occurrence of a drawback that an average particle size of the conductive high-molecular weight compound is excessively large so that it is difficult to introduce a conductive high-molecular weight compound into etching pits (recessed portions) formed on a surface of the anode foil.

According to the solid electrolytic capacitor of the embodiment, the water-soluble high-molecular weight compound is polyalkylene oxide, water-soluble silicone, branched polyether or derivatives of these materials and hence, and all these water-soluble high-molecular weight compounds have a large number of oxygen atoms thus having a high oxidizing ability. Accordingly, by adopting the above-mentioned configurations, even when a defect occurs in an oxide film in the case where the solid electrolytic capacitor is used for a long time, a high oxidizing ability which the above-mentioned water-soluble high-molecular weight compound has can be used to repair the defective portion and hence, the solid electrolytic capacitor of the embodiment can provide a solid electrolytic capacitor having a more excellent long lifetime property.

According to the method of manufacturing a solid electrolytic capacitor of the embodiment, it is possible to manufacture the solid electrolytic capacitor of the embodiment having the above-mentioned excellent properties.

According to the method of manufacturing a solid electrolytic capacitor of the embodiment, as the water-soluble high-molecular weight compound solution, a water-soluble high-molecular weight compound solution which is prepared by adding the water and the alcohol having a nitro group into the water-soluble high-molecular weight compound is used. Accordingly, it is possible to easily prepare the water-soluble high-molecular weight compound solution.

In the method of manufacturing a solid electrolytic capacitor of the embodiment, in the second step, the solid electrolyte is introduced into the gap using a vacuum impregnation method or an immersion impregnation method, and in the third step, the water-soluble high-molecular weight compound solution is introduced into the gap using a vacuum impregnation method or an immersion impregnation method. By adopting such a method, it is possible to easily introduce a predetermined amount of solid electrolyte into an extremely narrow gap formed between the anode foil and the cathode foil and it is also possible to easily introduce a predetermined amount of water-soluble high-molecular weight compound solution into an extremely narrow gap formed between the anode foil and the cathode foil.

TEST EXAMPLES

Hereinafter, advantageous effects of the solid electrolytic capacitor of the present invention are described in detail with reference to test examples.

Test Example 1

The test example 1 is a test example which proves that the solid electrolytic capacitor of the present invention is a solid electrolytic capacitor which exhibits a lower leakage current (initial leakage current) than that of a conventional solid electrolytic capacitor.

1. Preparation of Specimens (1) Present Invention Example 1

A solid electrolytic capacitor substantially equal to the solid electrolytic capacitor 1 of the embodiment is prepared as the present invention example 1. In the present invention example 1, as a conductive high-molecular weight compound in a fine particle form, a conductive high-molecular weight compound which contains polyethylenedioxythiophene (conductive high-molecular weight compound) and a polystyrene sulfonic acid (dopant) is used. As a water-soluble high-molecular weight compound solution, a water-soluble high-molecular weight compound solution which is formed of: a water-soluble high-molecular weight compound in a liquid form being a mixed body of PEG300 (31.0 wt %) and PEG200 (66.0 wt %); water (2.0 wt %) and p-nitrobenzyl alcohol (1.0 wt %) is used. The solid electrolytic capacitor of the present invention example 1 is the solid electrolytic capacitor at the stage where assembling and sealing steps have been performed and aging step has not yet been performed. The solid electrolytic capacitor of the present invention example 1 is a solid electrolytic capacitor having a diameter of 10 mm, a height of 10.5 mm, and a rated voltage of 50V.

(2) Comparison Example 1

A solid electrolytic capacitor substantially equal to the solid electrolytic capacitor of the present invention example 1 except for the following is prepared as the comparison example 1. That is, in the comparison example, in place of a water-soluble high-molecular weight compound solution which is formed of a water-soluble high-molecular weight compound in a liquid form, water and alcohol having a nitro group, a water-soluble high-molecular weight compound solution which is formed of a water-soluble high-molecular weight compound in a liquid form and contains neither water nor alcohol having a nitro group (that is, water-soluble high-molecular weight compound in a liquid form) is introduced. In the comparison example 1, as the water-soluble high-molecular weight compound, a mixed body of PEG300 (33.0 wt %) and PEG200 (67.0 wt %) is used. The solid electrolytic capacitor of the comparison example 1 is the solid electrolytic capacitor after assembling and sealing steps are performed and aging step is not yet performed.

2. Evaluation Method

The evaluation of the test example 1 is performed in such a manner that an aging step is applied to the respective solid electrolytic capacitors (present invention example 1 and comparison example 1) at predetermined aging conditions (125° C., 50V) and a leakage current which flows in the aging step is measured. The measurement a leakage current is performed for 3,600 seconds.

3. Result of Evaluation

Figure 8:
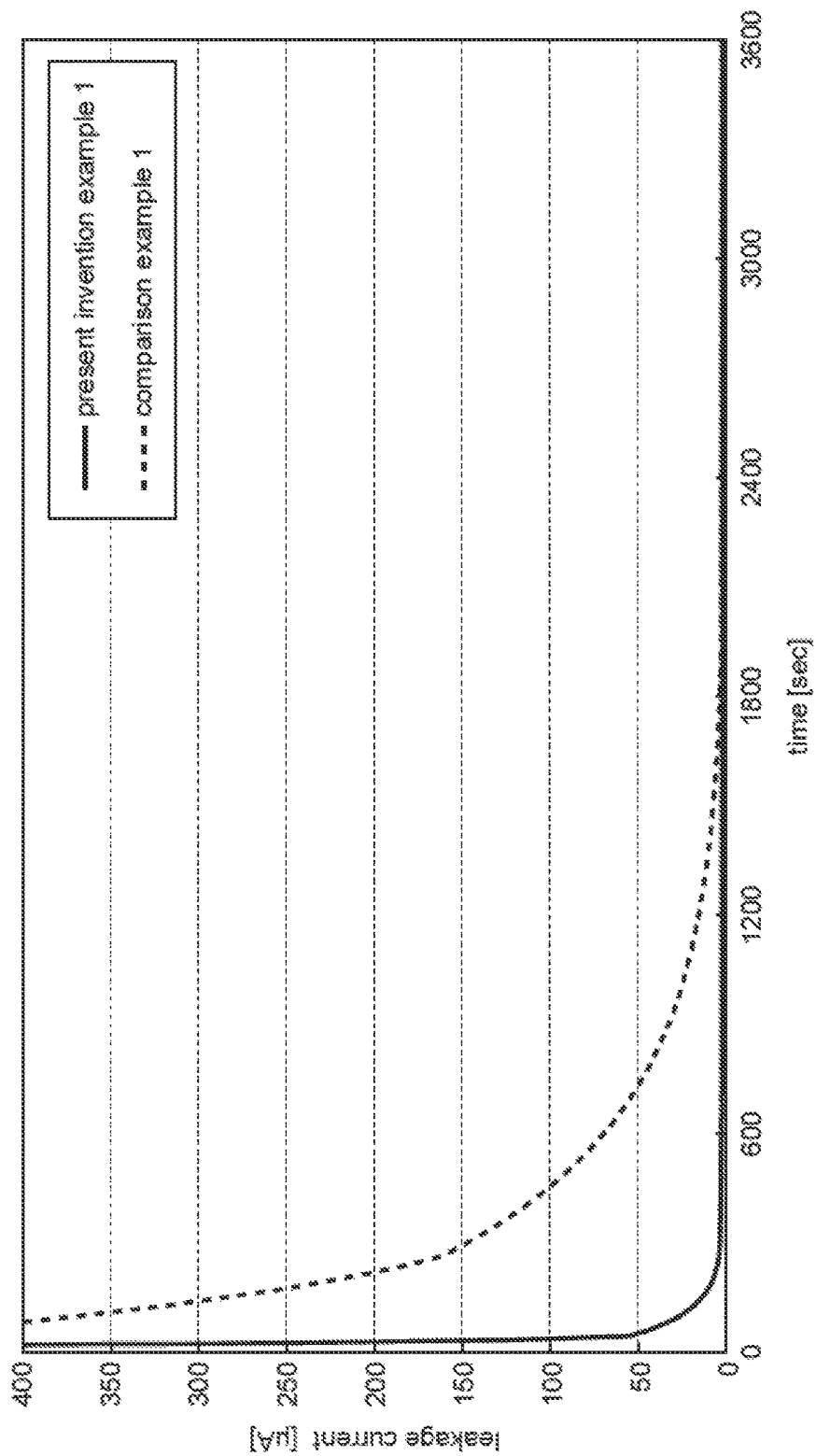
FIG. 8 is a graph showing the result of a test example 1.

FIG. 8 is a graph showing a result of the test example 1.

As can be understood from FIG. 8, it is confirmed that the solid electrolytic capacitor of the present invention example 1 exhibits a lower leakage current than the solid electrolytic capacitor of the comparison example 1 throughout the aging step (0 seconds to 3600 seconds). Although it appears that the leakage current of the solid electrolytic capacitor of the present invention example 1 is substantially equal to the leakage current of the solid electrolytic capacitor of the comparison example 1 during a period from 1800 seconds to 3600 seconds in FIG. 8, by magnifying the graph vertically, it is confirmed that the leakage current of the solid electrolytic capacitor of the present invention example 1 is smaller than the leakage current of the solid electrolytic capacitor of the comparison example 1 (by more than one digit) during the period from 1800 seconds to 3600 seconds.

From the above result, it is confirmed that the solid electrolytic capacitor of the present invention (the solid electrolytic capacitor of the present invention example 1) exhibits a lower leakage current (initial leakage current) than the conventional solid electrolytic capacitor (the solid electrolytic capacitor of the comparison example 1). It is also confirmed that the aging step can be performed more efficiently within a shorter time and more efficiently with a smaller amount of electricity in the solid electrolytic capacitor of the present invention (the solid electrolytic capacitor of the present invention example 1) than the conventional solid electrolytic capacitor (the solid electrolytic capacitor of the comparison example 1).

Test Example 2

The test example 2 is a test example which proves that the solid electrolytic capacitor of the present invention is a solid electrolytic capacitor which exhibits a lower leakage current over a long period and a longer lifetime than those of a conventional solid electrolytic capacitor.

1. Preparation of Specimens (1) Present Invention Example 2

A solid electrolytic capacitor substantially equal to the solid electrolytic capacitor of the present invention example 1 is prepared as the present invention example 2. In the present invention example 2, as a water-soluble high-molecular weight compound solution, a water-soluble high-molecular weight compound solution which is formed of: a water-soluble high-molecular weight compound in a liquid form being a mixed body of PEG300 (33.0 wt %) and PEG200 (65.5 wt %); water (1.0 wt %) and p-nitrobenzyl alcohol (0.5 wt %) is used. The solid electrolytic capacitor of the present invention example 2 is the solid electrolytic capacitor after aging step is performed. The solid electrolytic capacitor of the present invention example 2 is formed of a solid electrolytic capacitor having a diameter of 10 mm, a height of 10.5 mm, and a rated voltage of 25V.

(2) Comparison Example 2

A solid electrolytic capacitor substantially equal to the solid electrolytic capacitor of the comparison example 1 is prepared as the comparison example 2. The solid electrolytic capacitor of the comparison example 2 is the solid electrolytic capacitor after aging step is performed. The solid electrolytic capacitor of the comparison example 2 is a solid electrolytic capacitor having a diameter of 10 mm, a height of 10.5 mm, and a rated voltage of 25V.

2. Evaluation Method

The evaluation of the test example 2 is performed as follows. The respective solid electrolytic capacitors (the present invention example 2 and the comparison example 2) are placed in a constant temperature bath at a temperature of 125° C. in a load non-applied state, are taken out from the constant temperature bath after a lapse of a predetermined time, are returned to a room temperature, and a leakage current is measured with respect to the respective solid electrolytic capacitors. After the measurement of a leakage current is finished, the respective solid electrolytic capacitors are returned to the constant temperature bath again. The evaluation is performed up to 5000 hours.

3. Result of Evaluation

Figure 9:
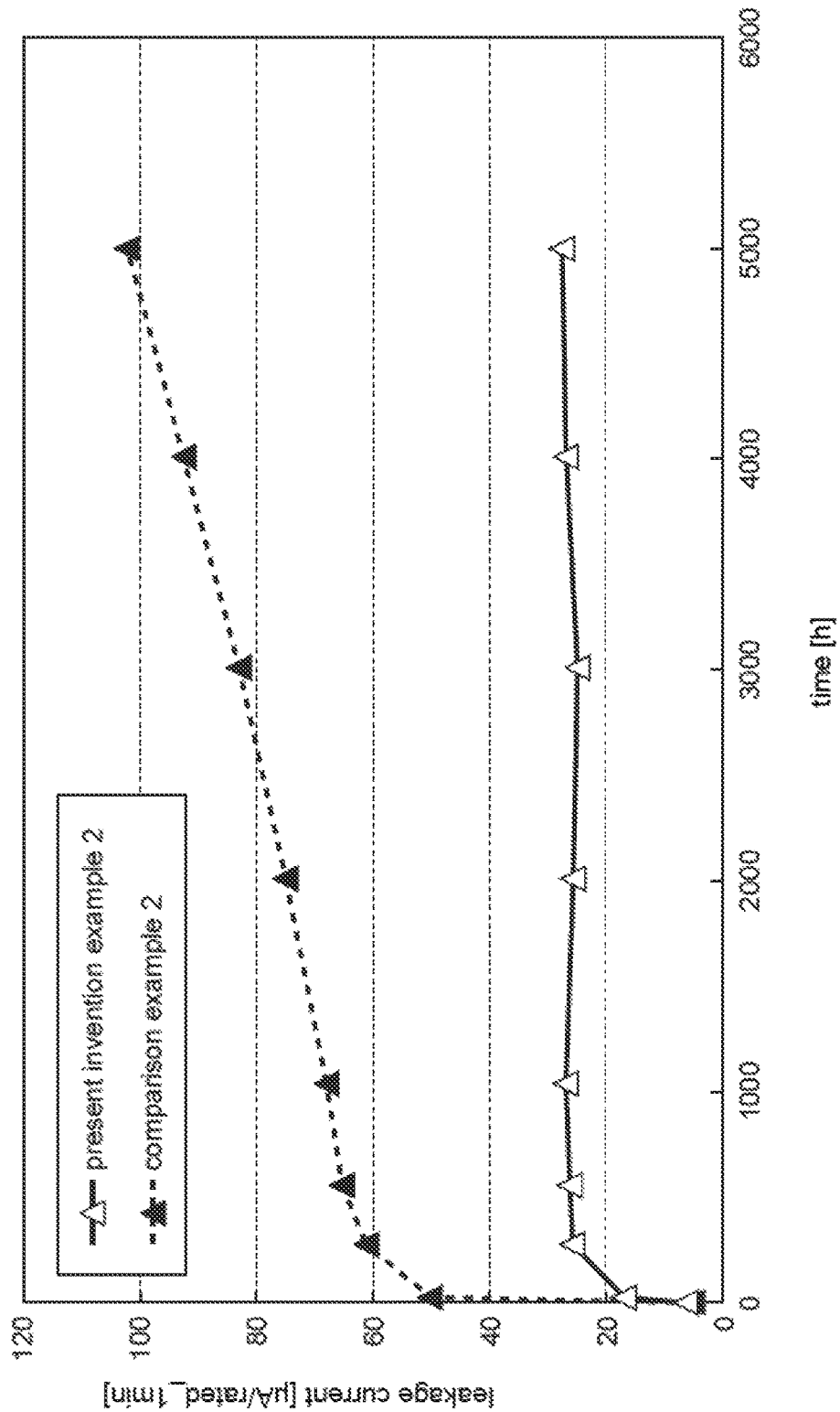
FIG. 9 is a graph showing the result of a test example 2.

FIG. 9 is a graph showing a result of the test example 2.
As can be understood from FIG. 9, it is confirmed that the solid electrolytic capacitor of the present invention example 2 exhibits a lower leakage current than the solid electrolytic capacitor of the comparison example 2 throughout the entire test period (0 hours to 5000 hours). Further, although a leakage current is gradually increased even after a leakage current is increased in an initial period in the solid electrolytic capacitor of the comparison example 2, there is substantially no increase of a leakage current after a leakage current is increased in an initial period in the solid electrolytic capacitor of the present invention example 2.

From the above result, it is confirmed that the solid electrolytic capacitor of the present invention (the solid electrolytic capacitor of the present invention example 2) is a solid electrolytic capacitor which exhibits a lower leakage current over a long period and a longer lifetime than those of the conventional solid electrolytic capacitor (the solid electrolytic capacitor of the comparison example 2).

Test Example 3

The test example 3 is a test example which proves that the solid electrolytic capacitor of the present invention is a solid electrolytic capacitor which exhibits a lower leakage current than a conventional solid electrolytic capacitor after the solid electrolytic capacitor is placed in a high temperature environment and is more difficult to expand than the conventional solid electrolytic capacitor when the solid electrolytic capacitor is placed in a high temperature environment or when the solid electrolytic capacitor is used for a long time.

1. Preparation of Specimens

FIG. 10 is a table showing a result of the test example 3. Solid electrolytic capacitors substantially equal to the solid electrolytic capacitor 1 of the embodiment are prepared as the present invention examples 3 to 11 and comparison examples 3 to 8. In the test example 3, as a water-soluble high-molecular weight compound solution, a solution which contains PEG600, PEG300, PEG200, water and p-nitrobenzyl alcohol at a ratio shown in FIG. 10 is used. The solid electrolytic capacitors of the present invention examples 3 to 11 and the solid electrolytic capacitors of the comparison examples 3 to 8 are solid electrolytic capacitors after an aging step is performed. The solid electrolytic capacitors of the present invention examples 3 to 11 and the solid electrolytic capacitors of the comparison examples 3 to 8 are respectively formed of a solid electrolytic capacitor having a diameter of 10 mm, a height of 10.5 mm, and a rated voltage of 25V.

2. Evaluation Method (1) Evaluation Method 1

The evaluation in the evaluation method 1 is performed such that a predetermined voltage (25V) is applied to the respective solid electrolytic capacitors (the present invention examples 3 to 11 and the comparison examples 3 to 8) immediately after the respective solid electrolytic capacitors are manufactured and after reflow is performed (after the respective solid electrolytic capacitors are heated at a temperature of 230° C. or above with a peak temperature of 260° C. for 40 seconds and, then, is gradually cooled to a room temperature), and a leakage current which flows after a lapse of 1 minute is measured. The score "good" is given when the leakage current is less than 30 μA, the score "fair" is given when the leakage current is equal to or more than 30 μA and less than 80 μA, and the score "bad" is given when the leakage current is 80 μA or more.

(2) Evaluation Method 2

The evaluation in the evaluation method 2 is performed in such a manner that heights of the respective solid electrolytic capacitors (present invention examples 3 to 11 and comparison examples 3 to 8) before reflow is performed and after reflow is performed (after the respective solid electrolytic capacitors are heated at a temperature of 230° C. or above with a peak temperature of 260° C. for 40 seconds and, then, is gradually cooled to a room temperature) are measured, and expanding amounts of the respective solid electrolytic capacitors in a height direction are calculate based on the measured heights. As a result, the score "good" is given when the expanding amount of the solid electrolytic capacitor is less than 0.3 mm, the score "fair" is given when the maximum expanding amount of the solid electrolytic capacitor is 0.3 mm or more and less than 0.5 mm, and the score "bad" is given when the maximum expanding amount of the solid electrolytic capacitor is 0.5 mm or more.

(3) Evaluation Method 3

The evaluation in the evaluation method 3 is performed in such a manner that, with respect to the respective solid electrolytic capacitors (the present invention examples 3 to 11 and the comparison examples 3 to 8), a load test where a DC current having a voltage of 25V is applied is performed in a constant temperature bath of 125° C. for 4000 hours and, thereafter, expanding amounts of the respective solid electrolytic capacitors in a height direction are measured thereafter. As a result, the score "good" is given when the expanding amount of the solid electrolytic capacitor is less than 0.3 mm, the score "fair" is given when the maximum expanding amount of the solid electrolytic capacitor is 0.3 mm or more and less than 0.5 mm, and the score "bad" is given when the maximum expanding amount of the solid electrolytic capacitor is 0.5 mm or more.

3. Result of Evaluation

(1) Result of Evaluation 1

As can be also understood from the table shown in FIG. 10, it is confirmed that when the content of water in a water-soluble high-molecular weight compound solution is set to 0.2 wt % or more, it is possible to realize the solid electrolytic capacitors having a small leakage current when the solid electrolytic capacitors are placed in a high temperature environment (comparison example 6, present invention examples 3 to 11, comparison examples 7 to 8).

(2) Result of Evaluation 2

As can be also understood from the table shown in FIG. 10, it is confirmed that when the content of water in a water-soluble high-molecular weight compound solution is set to 4 wt % or less, it is possible to realize the solid electrolytic capacitors which minimally expand when the solid electrolytic capacitors are placed in a high temperature environment (comparison examples 3 to 6, present invention examples 3 to 11).

(3) Result of Evaluation 3

As can be also understood from the table shown in FIG. 10, it is confirmed that (a) when the content of water in an water-soluble high-molecular weight compound solution is set to 0.1 wt % or less (comparison examples 3 to 5) or (b) when the content of water in an water-soluble high-molecular weight compound solution is 0.2 wt % or more and 4 wt % or less and the content of nitrobenzyl alcohol in the water-soluble high-molecular weight compound solution is set to 0.1 wt % or more (present invention example 3 to 11), it is possible to realize the solid electrolytic capacitors which minimally expand when the solid electrolytic capacitor are used for a long time.

Although the solid electrolytic capacitor and the method of manufacturing a solid electrolytic capacitor according to the present invention have been described based on the above-mentioned respective embodiments, the present invention is not limited to the above-mentioned embodiments. The present invention can be carried out in various modes without departing from the gist of the present invention, and the following modifications are also conceivable.

(1) In the above-mentioned test examples 1 to 3, nitrobenzyl alcohol (p-nitrobenzyl alcohol) is used as alcohol having a nitro group. However, the present invention is not limited to such alcohol. Besides nitrobenzyl alcohol, aromatic alcohol having a nitro group (for example, p-nitrophenethyl alcohol, 2-hydroxy-5-nitrobenzyl alcohol, 4-methyl-3-nitrobenzyl alcohol, 4, 5-dimethoxy-2-nitrobenzyl alcohol, 4-nitrocinnamyl alcohol) and other alcohols having a nitro group may be used.

(2) In the above-mentioned embodiments, although a solid electrolyte is introduced into a gap formed between the anode foil and the cathode foil by an immersion impregnation method in the second step, the present invention is not limited to such an electrolyte introducing method. A solid electrolyte may be introduced into a gap formed between the anode foil and the cathode foil using a vacuum impregnation method.

(3) In the above-mentioned embodiments, although a water-soluble high-molecular weight compound solution is introduced into a gap formed between the anode foil and the cathode foil by filling by an immersion impregnation method in the third step, the present invention is not limited to such an immersion impregnation method. A water-soluble high-molecular weight compound solution may be introduced into the gap formed between the anode foil and the cathode foil by filling by a vacuum impregnation method.

(4) Although a solid electrolyte which does not contain a water-soluble high-molecular weight compound is used as the solid electrolyte in the above-mentioned embodiments, the present invention is not limited to such a solid electrolyte. A solid electrolyte which contains a water-soluble high-molecular weight compound may be used as the solid electrolyte.

(5) Although the solid electrolytic capacitor according to the present invention has been described using a winding-type solid electrolytic capacitor in the above-mentioned respective embodiments, the present invention is not limited to such a solid electrolytic capacitor. The present invention is also applicable to other solid electrolytic capacitors including a lamination-type solid electrolytic capacitor.

What is claimed is:

1. A solid electrolytic capacitor comprising:
    an anode foil having a surface on which an oxide film is formed;
    a cathode foil; and
    a separator disposed between the anode foil and the cathode foil, wherein
    a solid electrolyte made of a conductive high-molecular weight compound in a fine particle form and a water-soluble high-molecular weight compound solution which is formed of a water-soluble high-molecular weight compound in a liquid form, water and alcohol having a nitro group are introduced into a gap formed between the anode foil and the cathode foil in a state where the water-soluble high-molecular weight compound solution surrounds the solid electrolyte, and
    the content of the water in the water-soluble high-molecular weight compound solution is set to a value which falls within a range of from 0.2 wt % to 4 wt %, and the content of the alcohol having a nitro group in the water-soluble high-molecular weight compound solution is set to a value which falls within a range of from 0.1 wt % to 10 wt %.

2. The solid electrolytic capacitor according to claim 1, wherein the alcohol having a nitro group is aromatic alcohol having a nitro group.

3. The solid electrolytic capacitor according to claim 1, wherein a ratio of the solid electrolyte which occupies in the gap is set to a value which falls within a range of from 1 vol % to 30 vol %, and a ratio of the water-soluble high-molecular weight compound solution which occupies in the gap is set to a value which falls within a range of from 10 vol % to 99 vol %.

4. The solid electrolytic capacitor according to claim 1, wherein an average particle size of the conductive high-molecular weight compound is set to a value which falls within a range of from 1 nm to 300 nm.

5. The solid electrolytic capacitor according to claim 1, wherein the water-soluble high-molecular weight compound is a mixed material made of two or more kinds of water-soluble high-molecular weight compounds having different molecular weights.

6. The solid electrolytic capacitor according to claim 1, wherein the water-soluble high-molecular weight compound is polyalkylene oxide, water-soluble silicone, branched polyether, or a derivative of any one of polyalkylene oxide, water-soluble silicone, branched polyether.

7. A solid electrolytic capacitor, comprising:
an anode foil having a surface on which an oxide film is formed;
a cathode foil; and
a separator disposed between the anode foil and the cathode foil, wherein
a solid electrolyte made of a conductive high-molecular weight compound in a fine particle form and a water-soluble high-molecular weight compound solution which is formed of a water-soluble high-molecular weight compound in a liquid form, water and alcohol having a nitro group are introduced into a gap formed between the anode foil and the cathode foil in a state where the water-soluble high-molecular weight compound solution surrounds the solid electrolyte, and
a ratio of the solid electrolyte which occupies in the gap is set to a value which falls within a range of from 1 vol % to 30 vol %, and a ratio of the water-soluble high-molecular weight compound solution which occupies in the gap is set to a value which falls within a range of from 10 vol % to 99 vol %.

8. The solid electrolytic capacitor according to claim 7, wherein the alcohol having a nitro group is aromatic alcohol having a nitro group.

9. The solid electrolytic capacitor according to claim 7, wherein an average particle size of the conductive high-molecular weight compound is set to a value which falls within a range of from 1 nm to 300 nm.

10. The solid electrolytic capacitor according to claim 7, wherein the water-soluble high-molecular weight compound is a mixed material made of two or more kinds of water-soluble high-molecular weight compounds having different molecular weights.

11. The solid electrolytic capacitor according to claim 7, wherein the water-soluble high-molecular weight compound is polyalkylene oxide, water-soluble silicone, branched polyether, or a derivative of any one of polyalkylene oxide, water-soluble silicone, branched polyether.

12. A solid electrolytic capacitor, comprising:
an anode foil having a surface on which an oxide film is formed;
a cathode foil; and
a separator disposed between the anode foil and the cathode foil, wherein
a solid electrolyte made of a conductive high-molecular weight compound in a fine particle form and a water-soluble high-molecular weight compound solution which is formed of a water-soluble high-molecular weight compound in a liquid form, water and alcohol having a nitro group are introduced into a gap formed between the anode foil and the cathode foil in a state where the water-soluble high-molecular weight compound solution surrounds the solid electrolyte, and
the water-soluble high-molecular weight compound is a mixed material made of two or more kinds of water-soluble high-molecular weight compounds having different molecular weights.

13. The solid electrolytic capacitor according to claim 12, wherein the alcohol having a nitro group is aromatic alcohol having a nitro group.

14. The solid electrolytic capacitor according to claim 12, wherein an average particle size of the conductive high-molecular weight compound is set to a value which falls within a range of from 1 nm to 300 nm.

15. The solid electrolytic capacitor according to claim 12, wherein the water-soluble high-molecular weight compound is polyalkylene oxide, water-soluble silicone, branched polyether, or a derivative of any one of polyalkylene oxide, water-soluble silicone, branched polyether.

* * * * *